(12) United States Patent
Akita et al.

(10) Patent No.: US 8,400,547 B2
(45) Date of Patent: Mar. 19, 2013

(54) IMAGING APPARATUS AND DISPLAY CONTROL METHOD IN IMAGING APPARATUS

(75) Inventors: Miho Akita, Tokyo (JP); Kazuyuki Marukawa, Kanagawa (JP); Sho Tanaka, Tokyo (JP)

(73) Assignee: Sony Corporation (JP)

( * ) Notice: Subject to any disclaimer, the term of this patent is extended or adjusted under 35 U.S.C. 154(b) by 293 days.

(21) Appl. No.: 12/589,400

(22) Filed: Oct. 22, 2009

(65) Prior Publication Data

US 2010/0110215 A1 May 6, 2010

(30) Foreign Application Priority Data

Nov. 5, 2008 (JP) ................. P2008-284292

(51) Int. Cl.
*H04N 5/222* (2006.01)
*H04N 5/228* (2006.01)

(52) U.S. Cl. ................. 348/333.01; 348/222.1

(58) Field of Classification Search ............ 348/333.01, 348/333.13, 222.1; 382/181
See application file for complete search history.

(56) References Cited

U.S. PATENT DOCUMENTS

| 5,355,180 | A * | 10/1994 | Back .................... 348/734 |
| 7,515,130 | B2 * | 4/2009 | Nishino et al. ............ 345/87 |
| 7,526,195 | B2 * | 4/2009 | Oh ..................... 396/287 |
| 2004/0169769 | A1 * | 9/2004 | Tatamiya ................. 348/370 |
| 2005/0141063 | A1 * | 6/2005 | Nishino et al. ............ 358/527 |
| 2005/0270396 | A1 * | 12/2005 | Miyashita et al. ......... 348/333.01 |
| 2007/0115382 | A1 | 5/2007 | Fukuma et al. |
| 2007/0248330 | A1 * | 10/2007 | Pillman et al. ............. 386/107 |
| 2009/0303352 | A1 * | 12/2009 | Fujinawa ................ 348/231.99 |
| 2009/0322690 | A1 * | 12/2009 | Hiltunen et al. ............ 345/173 |
| 2010/0110265 | A1 * | 5/2010 | Akita et al. ............. 348/333.01 |
| 2010/0110268 | A1 * | 5/2010 | Akita et al. ............. 348/333.05 |
| 2011/0102621 | A1 * | 5/2011 | Kim .................... 348/222.1 |

FOREIGN PATENT DOCUMENTS

| JP | 2007-158799 A | 6/2007 |
| JP | 2008-228053 A | 9/2008 |

OTHER PUBLICATIONS

JP 2008-228053, Kanzaki, Sep. 25, 2008.*
Office Action from Japanese Application No. 2008-284292, dated Sep. 21, 2010.

* cited by examiner

*Primary Examiner* — Aung S Moe
(74) *Attorney, Agent, or Firm* — Lerner, David, Littenberg, Krumholz & Mentlik, LLP

(57) ABSTRACT

An imaging apparatus includes: a first display panel mounted on an apparatus casing so as to display images or data in a direction towards a user; a second display panel mounted on the apparatus casing so as to display images or data in a direction towards a subject; an imaging processor that performs a photoelectric conversion on incident light from the subject direction to obtain image signals; a person detector that detects whether or not a person is present in the subject direction; and a controller that allows images or data based on the image signals obtained by the imaging processor to be displayed on the first display panel and controls an operation of displaying the images or data based on the image signals obtained by the imaging processor on the second display panel in accordance with at least the detection results of the person detector.

16 Claims, 14 Drawing Sheets

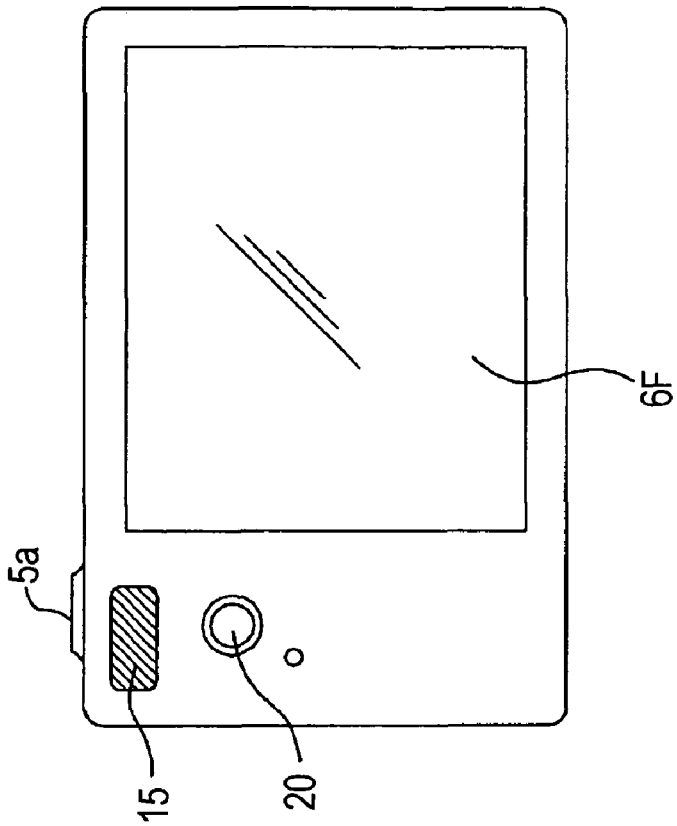
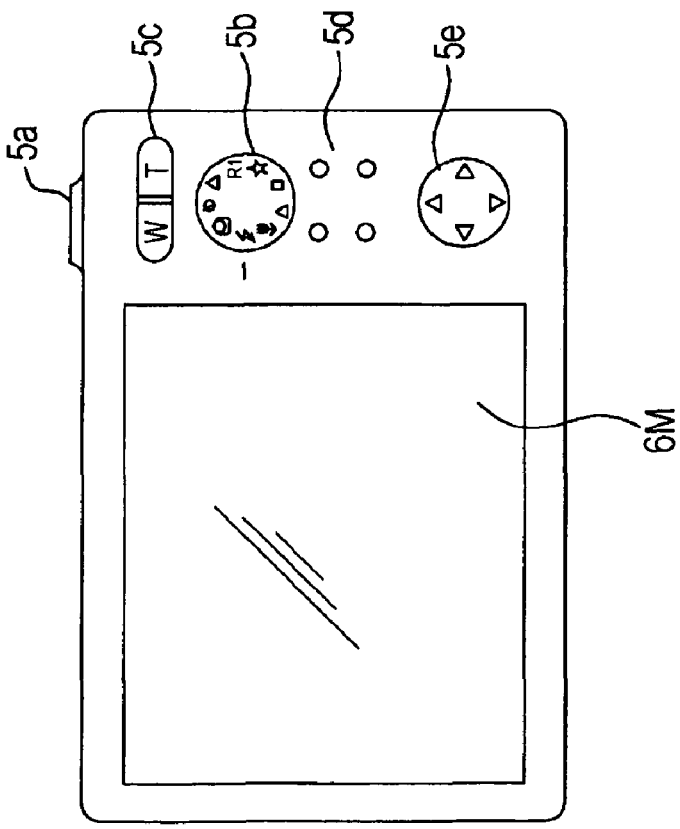

FIG. 5A
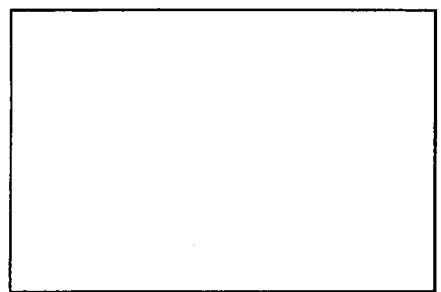 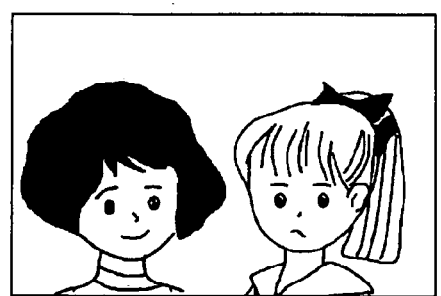
FIG. 5B
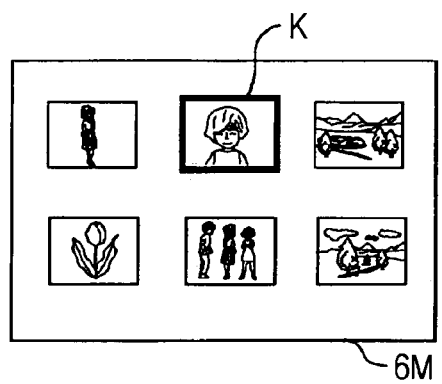 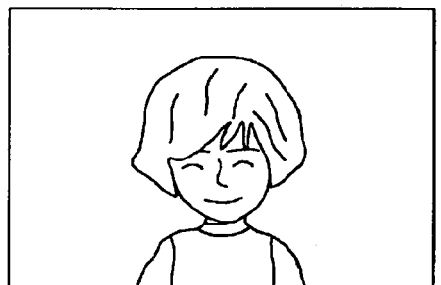
FIG. 5C
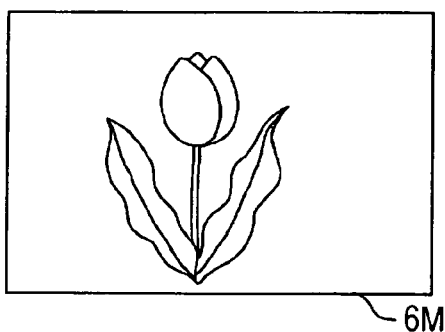 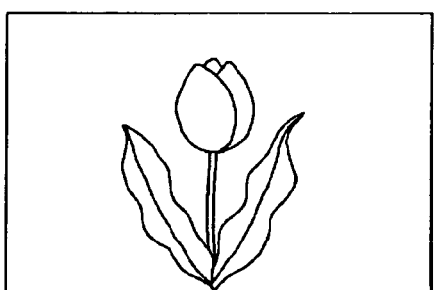

IMAGING APPARATUS AND DISPLAY CONTROL METHOD IN IMAGING APPARATUS

CROSS-REFERENCE TO RELATED APPLICATION

The present application claims priority from Japanese Patent Application No. JP 2008-284292 filed in the Japanese Patent Office on Nov. 5, 2008, the entire content of which is incorporated herein by reference.

BACKGROUND OF THE INVENTION

1. Field of the Invention

The present invention relates to an imaging apparatus and a display control method thereof, and more particularly, to an operation of displaying images or data on an imaging apparatus having a plurality of display panels on a casing thereof.

2. Description of the Related Art

Recently, imaging apparatuses such as digital cameras or digital video cameras have been popularized, and many imaging apparatuses are provided with a display panel which is configured by a liquid crystal panel, for example.

For example, Japanese Unexamined Patent Application Publication No. 2007-158799 discloses an imaging apparatus in which a relatively large display panel is provided on a camera casing so as to monitor a subject image on the display panel during shooting and play back the shot images during playback.

SUMMARY OF THE INVENTION

The present inventors propose a novel imaging apparatus provided with two display panels on a casing thereof.

That is to say, the imaging apparatus is provided not only with a display panel which is mounted on the apparatus casing so as to display images or data in a direction towards a user (photographer) similar to the related art, but also with another display panel which is mounted on a front side (subject side) of the apparatus casing so as to display images or data in a direction towards a subject.

When two display panels are provided in such a manner, it is desirable to display images or data on the respective display panels in accordance with operation states or conditions related to shooting. That is, it is desirable to realize a display operation capable of displaying images or data useful to users and preventing unnecessary power consumption.

Therefore, it is desirable appropriately to display images or data on an imaging apparatus having two display panels.

According to an embodiment of the present invention, an imaging apparatus includes a first display panel that is mounted on an apparatus casing so as to display images or data in a direction towards a user, a second display panel that is mounted on the apparatus casing so as to display images or data in a direction towards a subject, an imaging processor that performs a photoelectric conversion on incident light from the subject direction to obtain image signals, a person detector that detects whether or not a person is present in the subject direction, and a controller that allows images or data based on the image signals obtained by the imaging processor to be displayed on the first display panel and controls an operation of displaying the images or data based on the image signals obtained by the imaging processor on the second display panel in accordance with at least the detection results of the person detector.

According to another embodiment of the present invention, an imaging apparatus includes an imaging processor that performs photoelectric conversion on incident light coming through a lens system to obtain image signals, a first display panel that is arranged on a surface of an apparatus casing where the incident light is incident, a second display panel that is arranged on a surface opposing the first display panel, a person detector that detects whether or not a person is present in a subject direction, and a controller that allows images or data based on the image signals obtained by the imaging processor to be displayed on the first display panel and controls an operation of displaying the images or data based on the image signals obtained by the imaging processor on the second display panel in accordance with at least the detection results of the person detector.

When the presence of a person is detected by the person detector, the controller may perform a control such that the images or data based on the image signals obtained by the imaging processor are displayed on the second display panel.

Moreover, when the presence of a person is not detected by the person detector, the controller may perform a control such that images or data are not displayed on the second display panel.

Alternatively, when the presence of a person is not detected by the person detector, the controller may perform a control such that the images or data based on the image signals obtained by the imaging processor are displayed on the second display panel in a low-brightness state compared to a normal display operation.

Alternatively, the imaging apparatus according to the embodiment of the present invention may further include an image data reader that reads image data recorded on a recording medium, and when the presence of a person is not detected by the person detector, the controller may perform a control such that images or data based on the image data read by the image data reader are displayed on the second display panel.

Moreover, the controller may control the operation of displaying the images or data based on the image signals obtained by the imaging processor on the second display panel in accordance with the detection results of the person detector and the user-selected settings regarding operations of the imaging apparatus.

Furthermore, the controller may control the operation of displaying the images or data based on the image signals obtained by the imaging processor on the second display panel in accordance with the detection results of the person detector and internal detection information which is internally detected by the imaging apparatus.

Furthermore, the controller may control the operation of displaying the images or data based on the image signals obtained by the imaging processor on the second display panel in accordance with the detection results of the person detector and image analysis information which is obtained by analyzing the image signals obtained by the imaging processor.

Furthermore, the person detector may detect whether or not a person is present in the subject direction by performing image analysis on the image signals obtained by the imaging processor.

In this case, the person detector may perform person detection by determining whether or not the face of a person as the subject is included in the image signals based on the results of the image analysis on the image signals obtained by the imaging processor.

Alternatively, the person detector may be configured by a proximity sensor that detects presence of a person in the subject direction.

Moreover, the imaging apparatus according to the embodiment of the present invention may further include an image data reader that reads image data recorded on a recording medium, and the controller may allow images or data based on the image data read by the image data reader to be displayed on the first display panel and may control an operation of displaying the images or data based on the image data read by the image data reader on the second display panel in accordance with at least the detection results of the person detector.

Moreover, when images or data based on a plurality of image data read by the image data reader are displayed on the first display panel, the controller may allow images or data based on image data selected from the plurality of image data being displayed on the first display panel to be displayed on the second display panel.

According to a further embodiment of the present invention, a display control method of an imaging apparatus includes the steps of detecting whether or not a person is present in a subject direction, allowing images or data based on image signals which are obtained by performing a photoelectric conversion on incident light from the subject direction to be displayed on a first display panel that is mounted on an apparatus casing so as to display images or data in a user direction, and controlling an operation of displaying the images or data based on the image signals on a second display panel that is mounted on the apparatus casing so as to display images or data in the subject direction in accordance with at least the detection results in the person detection step.

According to a still further embodiment of the present invention, a display control method of an imaging apparatus includes the steps of detecting whether or not a person is present in a subject direction, allowing images or data based on image signals which are obtained by performing a photoelectric conversion on incident light coming through a lens system to be displayed on a first display panel that is arranged on a surface of an apparatus casing where the incident light is incident, and controlling an operation of displaying the images or data based on the image signals on a second display panel that is arranged on a surface opposing the first display panel in accordance with at least the detection results in the person detection step.

That is to say, according to the embodiments of the present invention, a necessary display operation is performed on the second display panel in accordance with whether or not a person is present in the subject direction.

For example, in a monitoring period during still-image shooting (i.e., at the time of catching a good shutter timing to capture still images), a user of the imaging apparatus (i.e., a photographer shooting still images with the imaging apparatus) monitors a subject image on the first display panel. The monitoring image is an image signal which is obtained by the image sensor during that period and is a real-time movie of a subject scene, also referred to as a through image. In this way, the photographer monitors the subject image to be captured and performs a release operation (shutter operation) at a desired time. The described operations are the same as those of a general imaging apparatus.

It may be preferable to display images or data, namely the monitoring image as the through image, based on the image signals on the second display panel in the monitoring period. For example, if the subject is a person, the person may be able to confirm his/her look or posture to be shot from the displayed images or data on the second display panel.

However, such an additional display is useful only when a person is present on the subject side. For example, when a photographer is imaging a landscape without any person, there will be no person monitoring the display of the second display panel. Therefore, it is useless to display the monitoring image on the second display panel in such a situation. It is therefore appropriate to turn off the second display panel to prevent unnecessary power consumption.

For example, by appropriately controlling the display operation of the second display panel in accordance with situations, it is possible to display useful or highly amusing images or data using two display panels while preventing unnecessary power consumption even when two display panels are provided.

According to the embodiments of the present invention, the imaging apparatus is provided with two display panels which can be viewed from both user and subject sides, thus enabling appropriate images or data to be displayed on the respective display panels in accordance with operation states or conditions related to shooting. Particularly, the display operation of the second display panel is controlled in accordance with the presence of a person on the subject side. Therefore, it is possible to provide a novel and useful imaging apparatus capable of displaying useful or highly amusing images or data and preventing an unnecessary display operation.

BRIEF DESCRIPTION OF THE DRAWINGS

FIGS. 1A and 1B are explanatory diagrams showing an external view of an imaging apparatus according to an embodiment of the present invention;

FIGS. 5A to 5C are explanatory diagrams showing an image display example of the imaging apparatus according to the embodiment;

DESCRIPTION OF THE PREFERRED EMBODIMENTS

Figure 2:
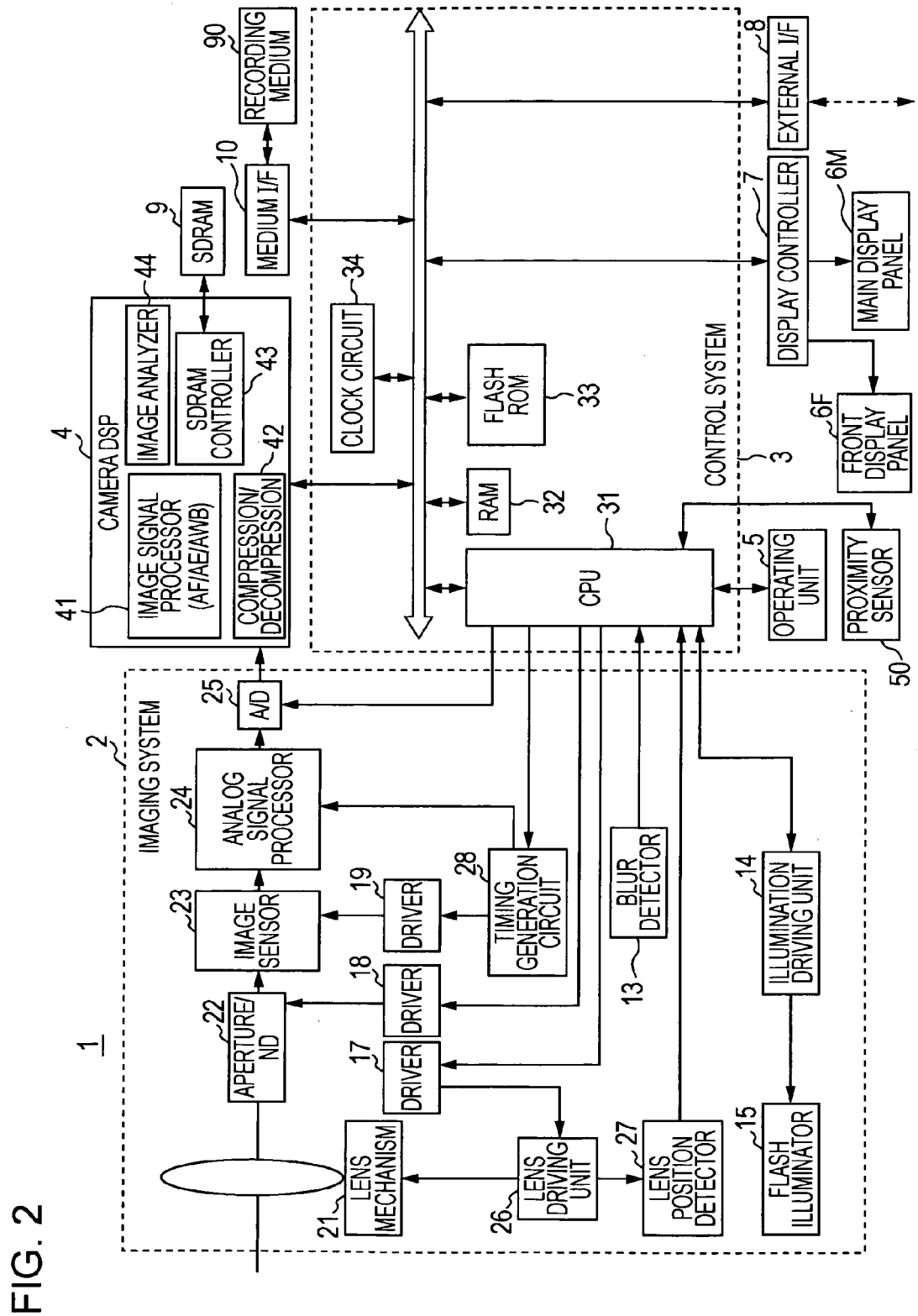
FIG. 2 is a block diagram of the imaging apparatus according to the embodiment.

Hereinafter, preferred embodiments of the present invention will be described in the following order:
1. Configuration of Imaging Apparatus;
2. Operation State Transition;
3. Screen Display Example of Both Display Panels;
4. Display Control of Front Display Panel during Monitoring;
   4-1. Exemplary Processing Based on Person Recognition;
   4-2. Exemplary Processing Based on Person Recognition and User Settings;
   4-3. Exemplary Processing Based on Person Recognition and Internal Detection Information;
   4-4. Exemplary Processing Based on Person Recognition and Other Image Analysis Information;
5. Display Control of Front Display Panel during Playback; and
6. Modification 1. Configuration of Imaging Apparatus The configuration of an imaging apparatus, as a digital camera, according to the embodiment of the present invention will be described with reference to FIGS. 1A and 1B and FIG. 2.

FIGS. 1A and 1B show external views of an imaging apparatus 1 according to the present embodiment, seen from a rear surface side (user side) and a front surface side (subject side), respectively.

The imaging apparatus 1 has an imaging lens 20, a flash illuminator 15, and the like mounted on a front surface thereof.

Moreover, controls for user operations are mounted at respective locations on a top surface of a casing thereof or a rear surface thereof. For example, the controls include a release button 5a, a mode dial 5b, a W/T (zoom) button 5c, various control buttons 5d, and an arrow button 5e.

The mode dial 5b is used for selecting a shooting mode, for example. The control buttons 5d enable users to display menus, enter a playback mode, or adjust exposure values.

The arrow button 5e is used for various operations including selecting/determining an operation menu item being displayed on a display panel 6, for example.

The imaging apparatus 1 is provided with a main display panel 6M which is mounted on the rear surface side and configured by a liquid crystal panel or an organic EL (electroluminescence) panel, as shown in FIG. 1A, and a front display panel 6F which is mounted on the front surface side and configured by a liquid crystal panel or an organic EL panel, as shown in FIG. 1B. That is to say, the main display panel 6M and the front display panel 6F are mounted on mutually opposing surfaces (opposite surfaces) on the casing.

The main display panel 6M and the front display panel 6F are configured with the same screen size, for example, and are provided so as to occupy a relatively large area on the rear and front surfaces of the casing, respectively.

The main display panel 6M is configured basically to display a monitoring image (a through image) of a subject in a monitoring period (i.e., at the time of catching a good shutter timing during shooting mode) so that a user can monitor a subject scene that is to be shot. Moreover, in a playback mode, the main display panel 6M displays playback images or thumbnail images in accordance with a user operation.

On the other hand, the front display panel 6F displays images or data toward a subject side. As will be described later, the front display panel 6F is also configured to display a monitoring image and the like so that a person present on the subject side can monitor the displayed images or data.

An exemplary configuration of the imaging apparatus 1 will be described with reference to FIG. 2.

As shown in FIG. 2, the imaging apparatus 1 includes an imaging system 2, a control system 3, a camera DSP (digital signal processor) 4, an operating unit 5, a main display panel 6M, a front display panel 6F, a display controller 7, an external interface 8, a SDRAM (synchronous dynamic random access memory) 9, and a medium interface 10.

The imaging system 2 is a part that executes an imaging operation and includes a lens mechanism 21, an aperture/ND filter mechanism 22, an image sensor 23, an analog signal processor 24, an A/D converter 25, a lens driving unit 26, a lens position detector 27, a timing generation circuit 28, a blur detector 13, a illumination driving unit 14, a flash illuminator 15, a lens driver 17, an aperture/ND driver 18, and an image sensor driver 19.

Incident light from a subject is introduced to the image sensor 23 through the lens mechanism 21 and the aperture/ND filter mechanism 22.

The lens mechanism 21 is an internal component of the imaging lens 20 shown in FIG. 1B and includes a plurality of optical lens group such as, for example, a cover lens, a focus lens, and a zoom lens. The lens driving unit 26 is configured by a conveying mechanism that conveys a focus lens or a zoom lens in an optical axis direction. The lens driving unit 26 is supplied with a drive power from the lens driver 17 to convey the focus lens or the zoom lens. A later-described CPU (central processing unit) 31 controls the lens driver 17 to execute a focus or zoom control.

The aperture/ND filter mechanism 22 includes an aperture mechanism and an ND filter mechanism that is inserted in a lens optical system to attenuate (adjust) an incident light intensity, thus performing light intensity adjustment.

The aperture/ND driver 18 regulates the incident light intensity by opening/closing the aperture mechanism. Moreover, the aperture/ND driver 18 regulates the incident light intensity selectively by inserting the ND filter to be placed on the optical axis of the incident light. The CPU 31 controls the aperture/ND driver 18 to drive the aperture mechanism or the ND filter, thus performing an incident light intensity control (exposure adjustment control).

Light flux from a subject passes through the lens mechanism 21 and the aperture/ND filter mechanism 22 to be imaged on the image sensor 23 as a subject image.

The image sensor 23 performs a photoelectric conversion on the imaged subject image to output an image signal corresponding to the subject image.

The image sensor 23 has a rectangular imaging area which is configured by a plurality of pixels and sequentially outputs image signals which are analog signals corresponding to charges stored in each pixel to the analog signal processor 24 on a pixel-by-pixel basis. The image sensor 23 may be configured, for example, by a CCD (charge coupled device) sensor array, a CMOS (complementary metal oxide semiconductor) sensor array, and the like.

The analog signal processor 24 has incorporated therein a CDS (correlated double sampling) circuit, an AGC (automatic gain control) circuit, and the like, and performs predetermined analog signal processing on the image signals input from the image sensor 23.

The A/D converter 25 converts the analog signal processed by the analog signal processor 24 into a digital signal and supply the digital signal to the camera DSP 4.

The timing generation circuit 28 is controlled by the CPU 31 and controls the operation timings of the image sensor 23, the analog signal processor 24, and the A/D converter 25.

That is to say, the timing generation circuit 28 supplies various timing signals for controlling the imaging timings of the image sensor 23, such as, for example, an exposure/charge-readout timing signal, an electronic shutter timing signals, a transfer clock, and a frame rate synchronization signal, to the image sensor 23 via the image sensor driver 19. Moreover, the timing generation circuit 28 supplies the various timing signals to the analog signal processor 24 so that the analog signal processor 24 perform the above-mentioned processing in synchronism with transfer of the image signals from the image sensor 23.

The CPU 31 is able to change the frame rate of the images and control the electronic shutter (specifically, variable exposure time in a frame) by controlling the respective timing signals generated by the timing generation circuit 28. Moreover, the CPU 31 is able to perform a variable gain control on the image signals, for example, by causing the timing generation circuit 28 to supply a gain control signal to the analog signal processor 24.

The blur detector 13 detects the amount of hand shaking or the amount of movement of the imaging apparatus 1 itself. The blur detector 13 is configured, for example, by an acceleration sensor and a vibration sensor, and supplies detection information as the blur amount to the CPU 31.

The flash illuminator 15 is driven by the illumination driving unit 14. The CPU 31 is able to activate the flash illuminator 15 at a predetermined timing, in accordance with a user operation or the like, by transmitting a flash activation command to the illumination driving unit 14.

The camera DSP 4 performs various digital signal processing on the image signals input from the A/D converter 25 of the imaging system 2.

For example, as shown in the drawing, the camera DSP 4 includes an image signal processor 41, a compression/decompression processor 42, a SDRAM controller 43, and an image analyzer 44, whose processing functions are realized by the internal hardware and software of the camera DSP 4.

The image signal processor 41 processes image signals input thereto. For example, the processing performed by the image signal processor 41 includes an auto focus (AF) process and an auto iris (AE) process, which are calculation processes for controlling the driving of the imaging system 2 based on the image signals, and an auto white balance (AWB) process which is a process performed on the input image signals.

For the auto focus process, the image signal processor 41 detects the contrast of the input image signals and delivers the detection information to the CPU 31. Various control methods are known as an auto focus control method. In a so-called contrast AF method, a focus lens is forcibly moved to detect the contrast of the image signals at each time point, whereby the position of the focus lens yielding the optimum contrast is determined. That is to say, the CPU 31 monitors the contrast values detected by the image signal processor 41 prior to shooting while controlling the movement of the focus lens so that the optimum contrast position is used as the optimum focus position.

As a focus control method during shooting, a so-called wobbling AF detection method can be executed. The CPU 31 monitors the contrast values detected by the image signal processor 41 during shooting while finely moving the focus lens back and forth constantly. Although the optimum position of the focus lens changes with the situation of a subject, by detecting the contrast while finely moving the focus lens back and forth, it is possible to determine a change in a focus control direction in accordance with a change in the subject. In this way, auto focusing tracking the subject situation can be executed.

Addresses may be assigned to each conveying position of the conveying mechanism of the lens driving unit 26, so that the lens position can be determined by the conveying position address.

The lens position detector 27 reads the address as the current lens position of the focus lens to calculate the distance to a focused subject and supply the calculated distance to the CPU 31 as distance information. In this way, the CPU 31 is able to determine the distance to a main subject being focused.

As the auto iris process executed by the image signal processor 41 of the camera DSP 4, the subject brightness is calculated, for example. For example, the average brightness of input image signals is calculated and supplied to the CPU 31 as subject brightness information, namely exposure value information. Various methods for calculating the average brightness may be used. For example, the average of the brightness signal values for the entire pixels of the image data of one frame or the average of the brightness signal values with weightings on the central area of an image may be calculated.

Based on the exposure value information, the CPU 31 performs an automatic exposure control. That is to say, the CPU 31 performs exposure adjustment by controlling the aperture mechanism, the ND filter, or the electronic shutter in the image sensor 23 and controlling the gain used by the analog signal processor 24.

The image signal processor 41 of the camera DSP 4 performs not only the signal generation processing used for the auto focus process and the auto iris process, but also processing of the image signals, such as, for example, auto white balancing, $\gamma$ correction, edge enhancement, and hand-shake blurring correction.

The compression/decompression processor 42 of the camera DSP 4 performs compression processing on the image signals or decompression processing on the compressed image data. For example, the compression/decompressing processing is performed in accordance with JPEG (Joint Photographic Experts Group) or MPEG (Moving Picture Experts Group) standards.

The SDRAM controller 43 writes/reads data to/from a SDRAM 9. The SDRAM 9 is used, for example, for temporarily storing the image signals input from the imaging system 2, securing storage or work areas used during the processing of the image signal processor 41 or the compression/decompression processor 42, and storing information obtained by the image analyzer 44. The SDRAM controller 43 writes/reads such data to/from the SDRAM 9.

The image analyzer 44 performs an image analysis on the image data processed by the image signal processor 41, for example, thus performing various image recognition operations.

In the present embodiment, the image analyzer 44 performs processing for recognizing a person or the face of the person included in the subject image. Moreover, when the face of a person is recognized, the image analyzer 44 may perform processing for recognizing the orientation of the face or the eye sight direction. Furthermore, the image analyzer may detect various kinds of information recognizable by image analysis such as the ambient light conditions or the amount of movement of a subject relative to the imaging apparatus 1.

The control system 3 includes a CPU 31, a RAM 32, a flash ROM 33, a clock circuit 34. Each part of the control system 3, the camera DSP 4, each part of the imaging system 2, the display controller 7, the external interface 8, and the medium interface 10 are connected via a system bus so as to be able to communicate image data or control information with each other.

The CPU 31 controls the overall operation of the imaging apparatus 1. That is to say, the CPU 31 performs various computation operations and exchanges controls signals with the respective parts based on the program stored in the internal ROM or the like and the user operations input via the operating unit 5, whereby necessary operations are executed by the respective parts. Particularly, the CPU 31 performs a display control of the main display panel 6M and a later-described control process for controlling the display operation of the front display panel 6F.

The RAM (random access memory) 32 temporarily stores the image signals (image data of each frame) processed by the camera DSP 4 or stores information generated during the processing of the CPU 31.

The flash ROM 33 is used for storing the image data as the images (which are imaged by a user as still images or movies) or storing other information which is necessary to be stored in a nonvolatile manner. The flash ROM 33 may store control software program or camera setting data of the imaging apparatus 1.

The clock circuit 34 counts the current date and time information (in the format of yyyy/mm/dd hh/mm/ss).

The operating unit 5 is configured by the various controls 5a to 5e shown in FIG. 1 and a signal generator generating signals corresponding to the operations that the user has made. The user operation information obtained from the various controls is transmitted from the operating unit 5 to the CPU 31.

The operating unit 5 may be configured to support a touch panel operation, in addition to the controls. For example, a touch sensor may be mounted on the main display panel 6M so that a user can input its operations via a touch operation on a screen display.

The display controller 7 performs a necessary display operation on the main display panel 6M and the front display panel 6F based on the control of the CPU 31.

The display operation of the main display panel 6M is an operation of displaying a monitoring image (through image), a playback image read from the recording medium 90 or the flash ROM, a control menu, various icons, and time on the main display panel 6M.

Moreover, the display operation of the front display panel 6F is an operation of displaying a monitoring image and a playback image on the front display panel 6F.

The medium interface 10 performs reading/writing of data from/to the recording medium 90 such as a memory card (card-shaped removable memory) set in the imaging apparatus 1 based on the control of the CPU 31. For example, the medium interface 10 performs an operation of recording still image data or movie data obtained as the results of shooting on the recording medium 90. Moreover, in a playback mode, the medium interface 10 performs an operation of reading image data from the recording medium 90.

Although a removable memory card is exemplified as the recording medium 90, other types of recording medium capable of recording still image data or movie data obtained as the results of shooting may be used. For example, a removable disc medium such as an optical disc may be used, and a HDD (hard disk drive) may be mounted thereon for recording.

The external interface 8 transmits/receives various data to/from an external device via a predetermined cable in accordance with a signal format such as USB (universal serial bus). The signal format is not limited to the USB format, and an external interface compatible with other formats such as IEEE (Institute of Electrical and Electronics Engineers) 1394 format may be used.

Moreover, the external interface 8 may be configured to support infrared transmission, near-field radio communication, and other wireless communication method, instead of a wired transmission method.

The imaging apparatus 1 is capable of transmitting/receiving data to/from a personal computer and other various apparatuses via the external interface 8. For example, the imaging apparatus 1 is capable of transmitting image data to an external apparatus.

FIG. 2 shows a proximity sensor 50. The proximity sensor 50 is a sensor configured to detect whether or not a person is present on the front side (subject side) of the imaging apparatus 1. For example, a pyroelectric sensor may be used as the proximity sensor 50.

As described above, when the person detection is performed by the image analysis of the image analyzer 44, the proximity sensor 50 may not be provided, and alternatively, both the person detection by the image analysis and the detection by the proximity sensor 50 may be performed together.

2. Operation State Transition

Figure 3:
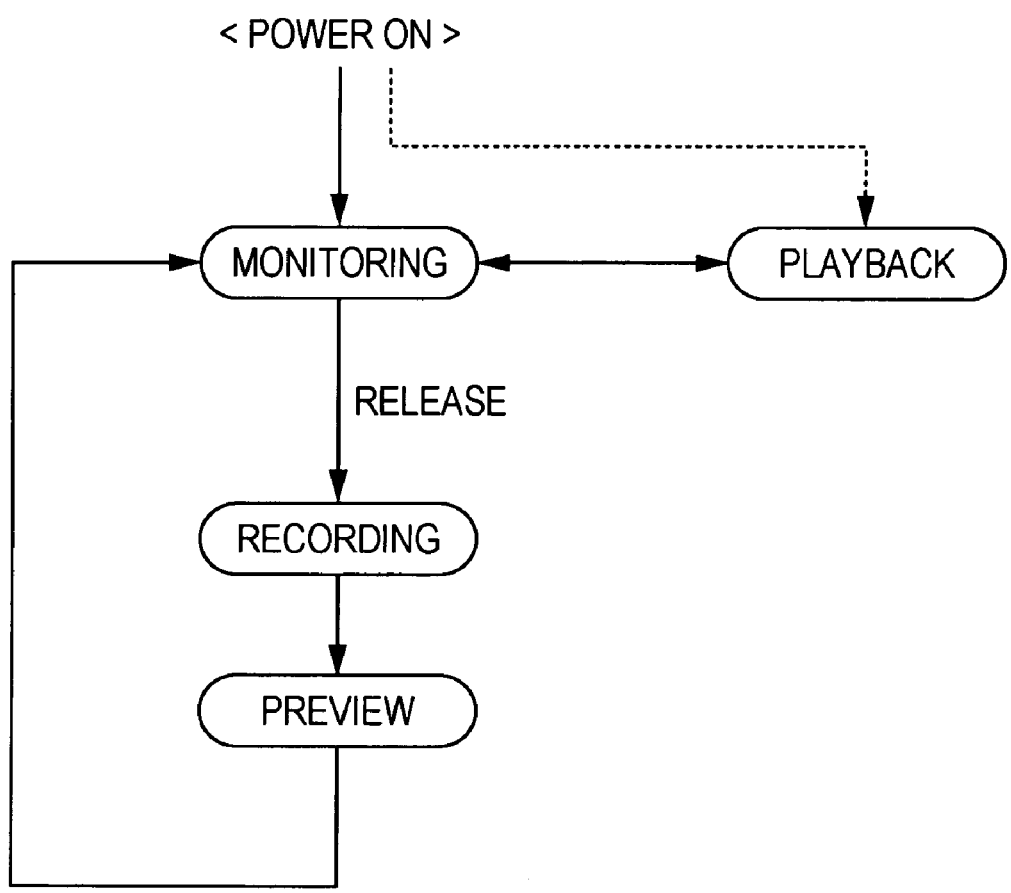
FIG. 3 is an explanatory diagram showing the operation state transition of the imaging apparatus according to the embodiment.

The operation state transition of the imaging apparatus 1 according to the present embodiment will be described with reference to FIG. 3. The operation states as used herein particularly refer to operation states as seen from the perspective of the contents displayed on the main display panel 6M.

The operation states of the imaging apparatus 1 transition between a monitoring period, a recording period, a preview period, and a playback period in accordance with the user operations or the like. Although practically there are other operation states such as a period where the imaging apparatus communicates with an external device, such operation states will be omitted in order to simplify the description.

The imaging apparatus 1 starts a monitoring operation upon power-on, for example. However, the imaging apparatus 1 may enter a playback operation state upon power-on, for example, if the user has selected a playback mode in the power-off state.

The monitoring period is an operation period where images are imaged by the imaging system 2. When a user performs a still image shooting with the imaging apparatus 1, the imaging apparatus 1 generally performs the monitoring operation first.

In the monitoring period, a subject image (through image) is displayed on the main display panel 6M.

That is to say, the CPU 31 causes the imaging system and the camera DSP 4 to execute respective necessary operations in the monitoring period. Then, image data of each frame which are supplied from the camera DSP 4 are read into the RAM 32, for example. The image data of each frame are transferred to the display controller 7, causing the main display panel 6M to display a monitoring image. As will be described later, the monitoring image may be displayed on the front display panel 6F.

In the monitoring period, the user selects a subject or catches a shutter timing while monitoring the monitoring image on the main display panel 6M.

When the user presses the release button 5a in the monitoring period, namely operates a shutter, the operation state transitions to a recording period.

The CPU 31 performs a process of storing the image data of one frame captured at the release timing as still image data. That is to say, the CPU 31 transmits the image data captured at the corresponding timing to the medium interface 10 to be recorded on the recording medium 90.

Moreover, in response to the shutter release, the image data may be recorded on the flash ROM 33 rather than the recording medium 90. Although the image data generally are recorded on the recording medium 90, the image data may be recorded on the flash ROM 33 if the recording medium 90 is not mounted thereon.

This recording period is a very short period occurring right after the shutter release from the user's perspective, during which no images or data are displayed on the main display panel 6M, for example.

The operation state transitions to the preview period for a predetermined period right after the recording operation is performed in response to the shutter release. The preview period is a period where the image recorded by the previous recording operation is displayed on the main display panel 6M. That is, this period allows the user to check the shot still image right after shooting.

The preview period continues for two or several seconds, and the CPU 31 controls the main display panel 6M to display the recorded still image data during this period.

When a predetermined period set for the preview period passes, the operation state returns to the monitoring state where the CPU 31 performs the control corresponding to the monitoring period.

That is to say, by such operations in the monitoring period, the recording period, and the preview period, a series of operations for shooting still images are completed.

The imaging apparatus 1 is also capable of shooting movies, and in the case of movie shooting, the recording period continues from the start to the end of the movie shooting. Moreover, the preview period is not provided.

When the user performs an operation that instructs a playback operation, the operation state transitions to a playback operation state (playback period).

In the playback period, an operation of playing back images recorded by shooting or the like on the recording medium 90 or the flash ROM 33 is performed.

The CPU 31 reads images recorded on the recording medium 90 or the flash ROM 33 in accordance with the user operations and controls the display controller 7 to display thumbnail images or a single playback image on the main display panel 6M. The playback images may be displayed on the front display panel 6F.

3. Screen Display Example of Both Display Panels

An exemplary screen display performed on the main display panel 6M and the front display panel 6F by the imaging apparatus 1 according to the present embodiment will be described with reference to FIGS. 4A to 4C and FIGS. 5A to 5C.

FIGS. 4A to 4C and FIG. 5A show examples of a screen display performed in the monitoring period.

Figure 4A:
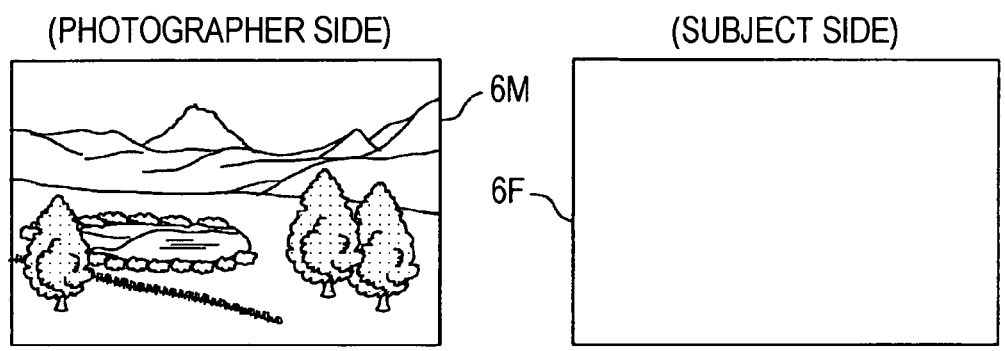
FIGS. 4A to 4C are explanatory diagrams showing an image display example of the imaging apparatus according to the embodiment.

FIG. 4A shows a state where the monitoring image (through image) is displayed on the main display panel 6M whereas no image is displayed on the front display panel 6F.

Figure 4B:
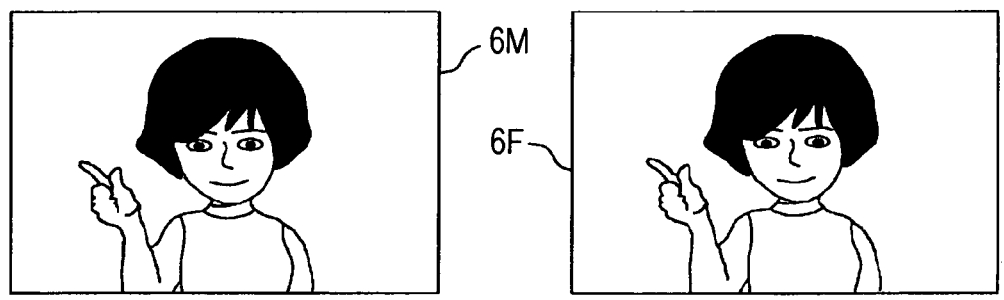

FIG. 4B shows a state where the monitoring image is displayed on the main display panel 6M, and the same monitoring image is displayed on the front display panel 6F.

Figure 4C:
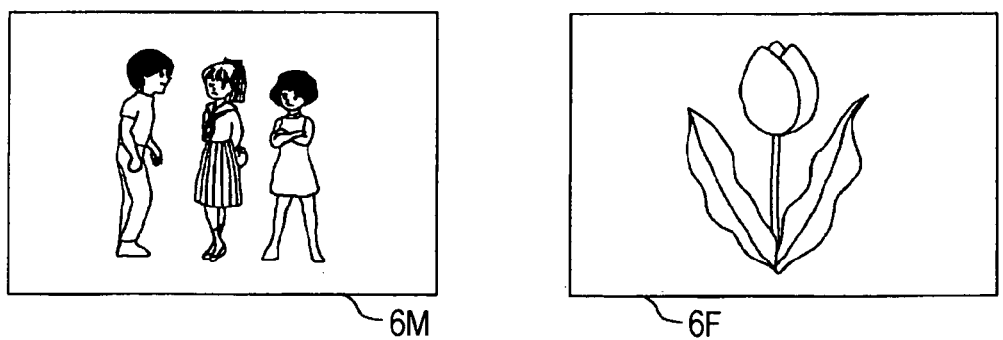

FIG. 4C shows a state where the monitoring image is displayed on the main display panel 6M, and a different image, for example, a playback image is displayed on the front display panel 6F. The playback image may be an image previously recorded on the recording medium 90 or the flash ROM 33 and may be an image stored in the imaging apparatus 1 in advance. For example, this example shows a state where image data which will be displayed when the monitoring image is not displayed on the front display panel 6F are stored in the flash ROM 33 or the like as preset image data, and the preset image data are read and displayed. Moreover, the data displayed are not limited to the recorded image, but text data, animation data, computer graphic data, or the like may be recorded on the recording medium 90 or the flash ROM 33 and displayed. That is to say, the playback image includes all images that can be displayed.

FIG. 5A shows an example where no image is displayed on the main display panel 6M whereas the monitoring image is displayed on the front display panel 6F.

Although these examples can be considered as display state examples of the main display panel 6M and the front display panel 6F in the monitoring period, the displayed contents are controlled by the CPU 31 in accordance with the subject conditions, the operating conditions of the imaging apparatus 1, the shooting modes, or the like during the monitoring period.

FIGS. 5B and 5C show examples of a screen display performed in the playback period.

FIG. 5B shows a state where playback images are displayed on the main display panel 6M in a thumbnail view whereas a playback image being selected with a cursor K among the thumbnail images is displayed on the front display panel 6F.

FIG. 5C shows a state where a single playback image is displayed on the main display panel 6M and the same playback image is displayed on the front display panel 6F.

These examples can be considered as display state examples of the main display panel 6M and the front display panel 6F in the playback period. Moreover, other examples may be configured.

For example, an example can be considered in which a playback image is displayed on the main display panel 6M whereas a preset image is displayed on the front display panel 6F.

Moreover, an example can be considered in which a list of thumbnail images is displayed on the main display panel 6M and the playback images are displayed sequentially (in slideshow) on the front display panel 6F.

Although the display examples are shown in FIGS. 4A to 4C and FIGS. 5A to 5C, the display on the main display panel 6M which faces the user performing the shooting and playback operations basically is performed as follows.

First, the monitoring image is displayed in the monitoring period. Moreover, in the preview period, the image that have been recorded is displayed for a predetermined period.

In the playback period, thumbnail images or playback images are displayed in accordance with the user operations.

The CPU 31 performs control so that such images are displayed on the main display panel 6M in accordance with the operation states or the user operations.

On the other hand, with respect to the front display panel 6F, the CPU 31 performs a display control such that images or data that are useful or amusing to viewers of the front display panel 6F are displayed or an unnecessary displaying operation is eliminated.

Various display control examples on the front display panel 6F will be described below.

4. Display Control of Front Display Panel During Monitoring 4-1. Exemplary Processing Based on Person Recognition FIG. 6A shows an exemplary display control that the CPU 31 executes on the front display panel 6F in the monitoring period.

As described above, in the monitoring period, the monitoring image that is obtained by the processing of the imaging system 2 and the camera DSP 4 is displayed on the main display panel 6M. That is to say, in the monitoring period, the CPU 31 performs a display control so that the image data supplied from the camera DSP 4 are displayed on the main display panel 6M as the through image.

Figure 6A:
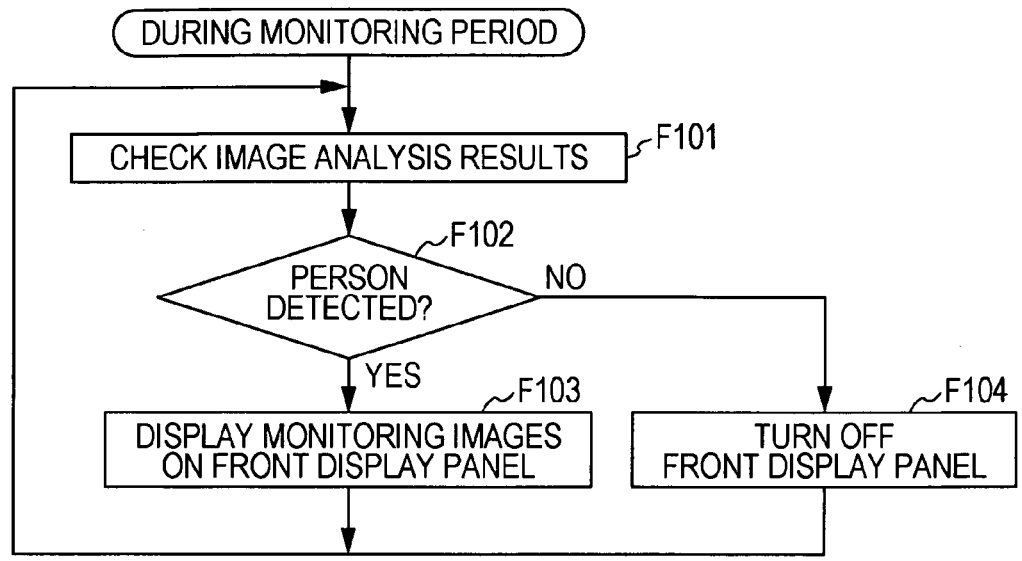
FIGS. 6A and 6B are flowcharts showing a display control example of a front display panel based on person recognition according to the embodiment.

At this time, in order to perform the display control on the front display panel 6F, the CPU 31 performs the process shown in FIG. 6A in parallel with the display control of the main display panel 6M.

First, in step F101, the CPU 31 checks the image analysis results of the image analyzer 44. The image analyzer performs an image analysis on the image data which are imaged by the imaging system 2 in the monitoring period and received by the camera DSP 4. For example, the image analyzer 44 performs an image analysis on the image data of each frame, or frames extracted intermittently, processed by the image signal processor 41. Then, the image analyzer 44 determines whether or not an image that can be recognized as a person is included in the image data being analyzed. That is, it is determined whether or not a contour that can be recognized as a person is included in an image. The determination results are supplied to the CPU 31. In step F101, the CPU 31 checks whether or not the presence of a person is recognized as the results of the determination.

When the presence of a person is recognized from the results of the image analysis, the flow proceeds from step F102 to step F103, and the CPU 31 causes the front display panel 6F to display the monitoring image. That is to say, the CPU 31 instructs the display controller 7 to display the same monitoring image being displayed on the main display panel 6M on the front display panel 6F.

In this case, the display states of the main display panel 6M and the front display panel 6F correspond to the states as shown in FIG. 4B.

On the other hand, when no person is detected as the results of the image analysis in step F101, the flow proceeds from step F102 to step F104, and the CPU 31 turns off the display of the front display panel 6F.

In this case, the display states of the main display panel 6M and the front display panel 6F correspond to the states as shown in FIG. 4A.

The CPU 31 executes the process shown in FIG. 6A repeatedly in the monitoring period.

The monitoring period ends, for example, when the operation state transitions to a recording operation in response to shutter release, when the operation state transitions to a playback operation in response to press of a playback button, or when a user powers off the imaging apparatus 1. The CPU 31 executes the process shown in FIG. 6A repeatedly until the monitoring period ends in response to such actions.

Therefore, when a user positions the imaging apparatus 1 towards a person during the monitoring period so that the person becomes the subject, the monitoring image is displayed on the front display panel 6F as shown in FIG. 4B. On the other hand, when the user is targeting a subject scene without any person such as a landscape, the front display panel 6F is turned off as shown in FIG. 4A. Moreover, when a person is detected as a subject again in the state of FIG. 4A, the monitoring image including the person is displayed on the front display panel 6F.

That is, according to this processing example, when a person as a subject being monitored is present in the front side, the monitoring image is displayed on the front display panel 6F, whereas the front display panel 6F is turned off when a person is not included as a subject.

When a person is a subject, the subject person can view the front display panel 6F. Therefore, the user can confirm his/her look or posture from the monitoring image in which the user is being shot. Therefore, the user effectively can utilize the display of the front display panel 6F, for example, by confirming by himself/herself whether the look is desirable as a photograph.

On the other hand, if a person is not present as a subject, it can be determined that there is no person viewing the front display panel 6F. Therefore, by turning off the display of the front display panel 6F (for example, only the front display panel 6F is turned off), it is possible to achieve a reduction in power consumption. That is to say, an unnecessary display that no one is viewing will be eliminated.

Although in step F101, the determination as to whether or not a person is present in the front side as a subject is made based on the image analysis, a process of checking the detection results of the proximity sensor 50 shown in FIG. 2 may be performed in step F101. Moreover, both the image analysis results and the detection results of the proximity sensor 50 may be checked in step F101.

Moreover, although in later-described processing examples of FIGS. 7 to 14, the determination as to the presence of a person in the front side is made based on face detection through image analysis, the modification that uses the proximity sensor 50 equally may be applied to the cases of FIGS. 7 to 14.

Although the process shown in FIG. 6A controls the display operation of the front display panel 6F based on person detection, "face" detection may be performed as the person detection.

For example, the image analyzer 44 determines whether or not a contour that can be recognized as a face or a facial element such as eyes, nose, or mouth is present in the image data, thus determining whether or not the "face" of a person as a subject is included in the image data.

Figure 6B:
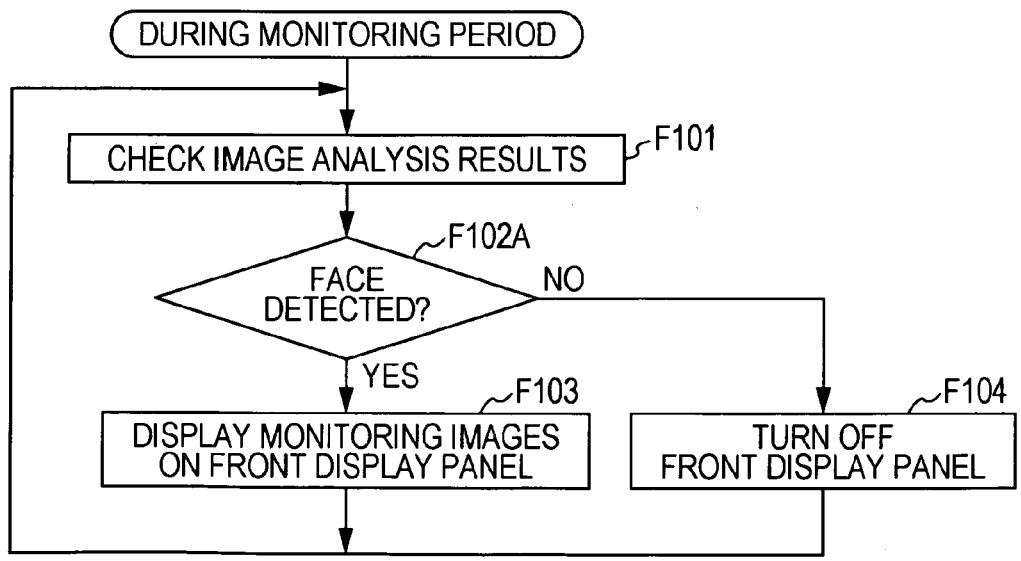

The processing of the CPU 31 in such a case is shown in FIG. 6B.

In step F101, the CPU 31 checks the image analysis results of the image analyzer 44 to determine whether or not the "face" is present. When the "face" is detected, the flow proceeds from step F102A to step F103, and the CPU 31 causes the front display panel 6F to display the monitoring image. On the other hand, when the "face" is not detected, the flow proceeds from step F102A to step F104, and the CPU 31 turns off the front display panel 6F.

As described above, the presence of a person in the front side may be detected based on the face detection rather than detection of the whole body of a person.

Figure 7:
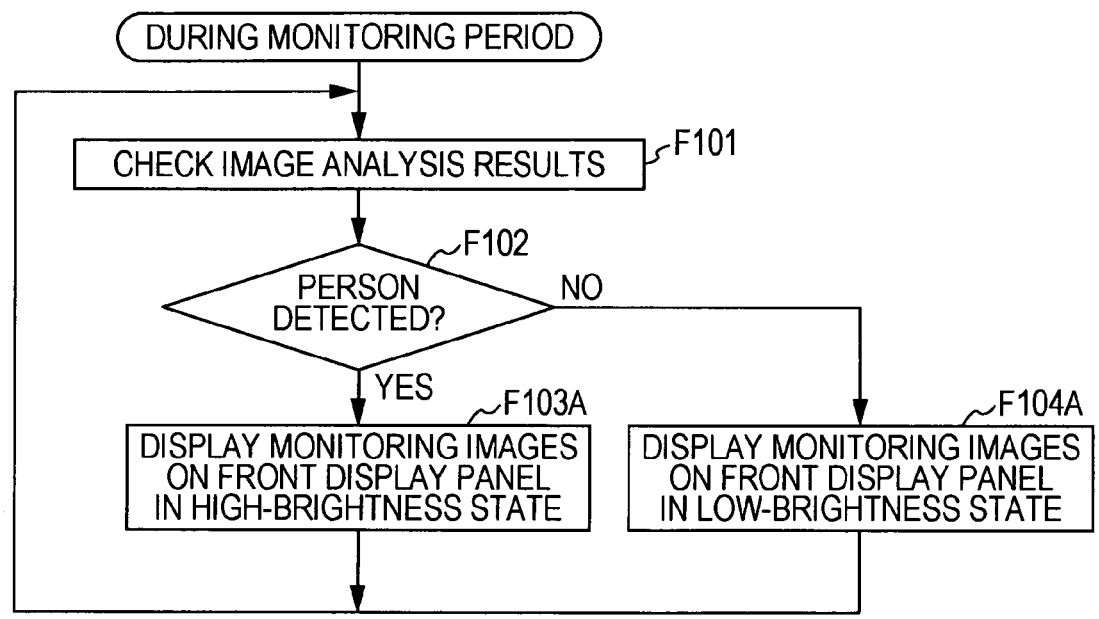
FIG. 7 is a flowchart showing a display control example of the front display panel based on person recognition according to the embodiment.

FIG. 7 shows another processing example in which the front display panel 6F is not turned off even when there is no person in the front side.

The operations in steps F101 and F102 are the same as those shown in FIG. 6A.

When it is determined that a person as a subject is present in the front side, the flow proceeds to step F103A, and the CPU 31 instructs the display controller 7 to display the monitoring image on the front display panel 6F in a high brightness state.

When it is determined that there is no person present in the front side as a subject, the flow proceeds to step F104A, and the CPU 31 instructs the display controller 7 to display the monitoring image on the front display panel 6F in a low brightness state.

That is to say, when there is a person who can view the front display panel 6F, the display brightness of the front display panel 6F is increased so that the person easily can view the monitoring image. On the other hand, when it is determined that there is no person present in the front side, the display brightness is decreased, thus achieving a reduction in power consumption. Decreased display brightness effectively can reduce the power consumption, for example, when a display device using a self-luminous element, such as an organic EL panel, is used as the front display panel 6F.

Next, a processing example shown in FIG. 8 will be described.

The operations in steps F101 and F102 are the same as those shown in FIG. 6A.

When it is determined that a person as a subject is present in the front side, the flow proceeds to step F103, and the CPU 31 instructs the display controller 7 to display the monitoring image on the front display panel 6F.

When it is determined that there is no person present in the front side as a subject, the flow proceeds to step F105, and the CPU 31 performs a process of reading the image data or the preset image data recorded on the recording medium 90 or the like. For example, the CPU 31 instructs the medium interface 10 to play back image data (the recorded image data or the like) from the recording medium 90. Alternatively, the CPU 31 performs a process of reading the preset image data or the recorded image data from the flash ROM 33. Then, the CPU 31 instructs the display controller 7 to display the read image data on the front display panel 6F. That is to say, similar to the example shown in FIG. 4C, an image different from the monitoring image is displayed on the front display panel 6F.

In this case, when a person is present as a subject, the person can monitor his/her image that is being recorded, similar to the example shown in FIG. 4B.

On the other hand, when there is no person present as a subject, an image that is not related to the subject is displayed on the front display panel 6F, similar to the example shown in FIG. 4C. Even when there is no person present as a subject, in many cases, there will be persons in the neighborhood. To those persons in the neighborhood, the display on the front display panel 6F may be recognized as an interesting exterior design of the imaging apparatus 1.

Moreover, in this case, by allowing the user to select the image to be displayed on the front display panel 6F, the user freely can set the exterior view of the imaging apparatus 1 by himself/herself, thus broadening the pleasure of camera use.

Figure 8:
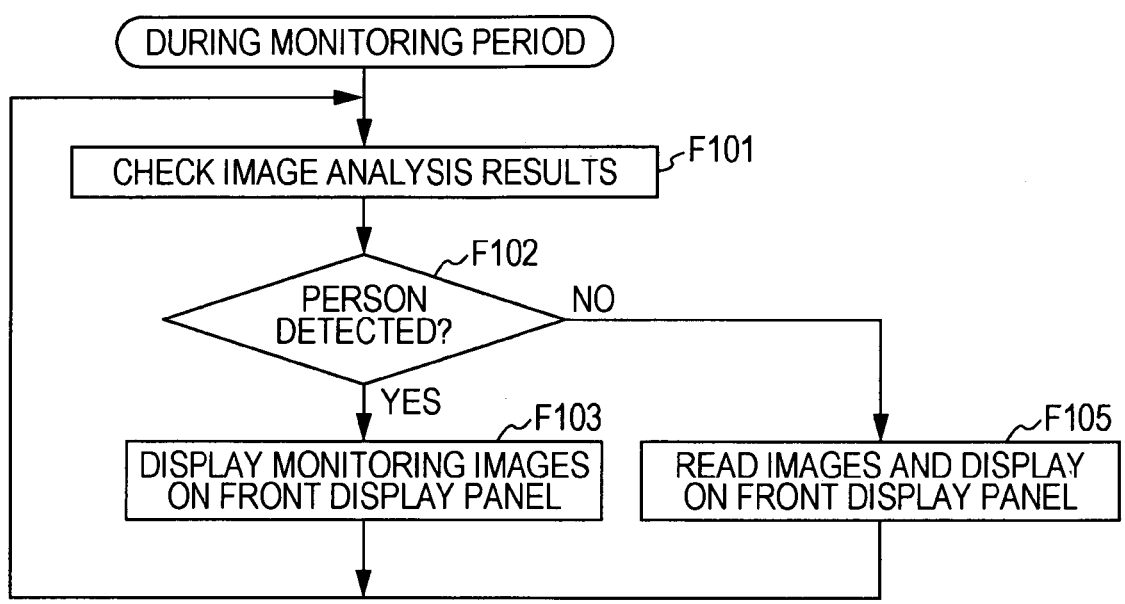
FIG. 8 is a flowchart showing a display control example of the front display panel based on person recognition according to the embodiment.

In the case of the processing example shown in FIGS. 7 and 8, the person recognition may be executed as the face recognition described in FIG. 6B.

Moreover, the image data read from the recording medium 90 for display may be text data or animation data.

4-2. Exemplary Processing Based on Person Recognition and User Settings

Although FIGS. 6 to 8 show the examples where the display state of the front display panel 6F is controlled based on the recognition results on the presence of a person in the front side, in this section will be described an example where the display control of the front display panel 6F is performed in consideration of the user setting states on the imaging apparatus 1 in addition to the person recognition.

The user settings refer to the user-selected setting states such as shooting mode settings, flash settings or zoom position settings.

Figure 9:
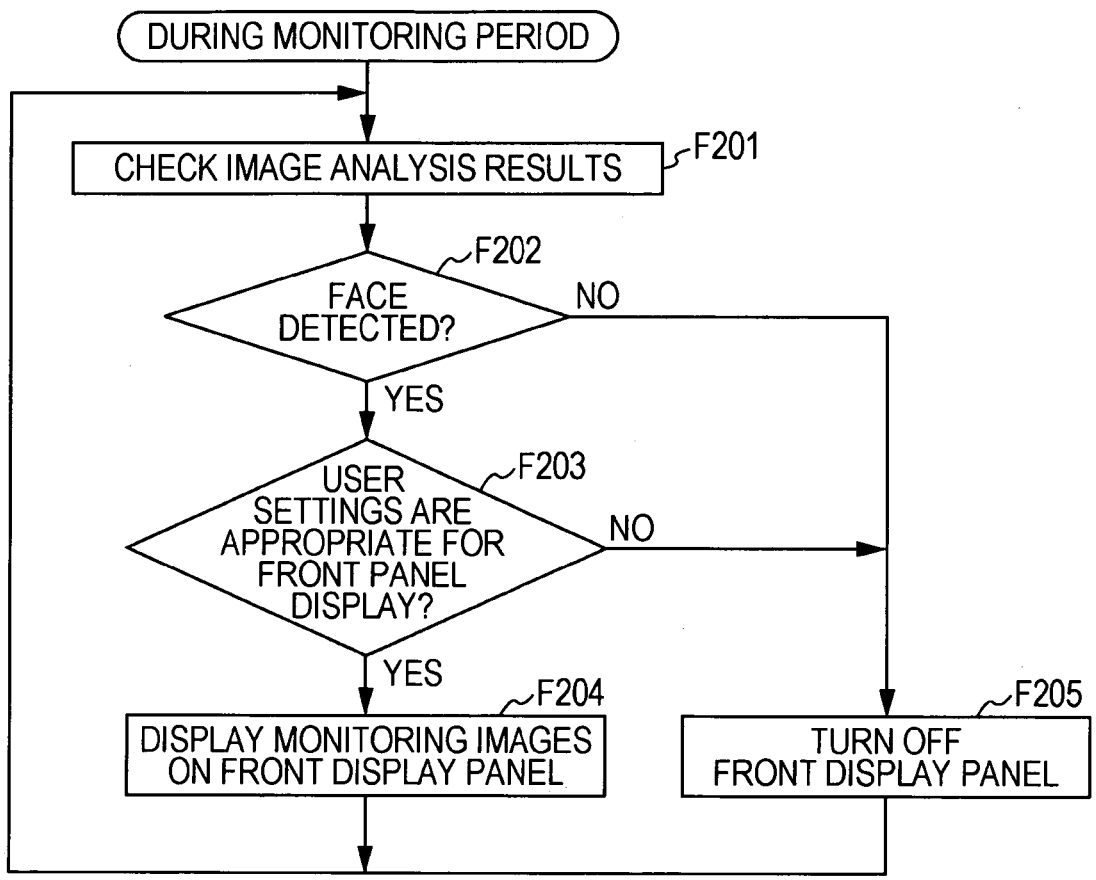
FIG. 9 is a flowchart showing a display control example of the front display panel based on person recognition and user settings according to the embodiment.

FIG. 9 shows an exemplary display control that the CPU 31 executes on the front display panel 6F in the monitoring period.

In the monitoring period, the monitoring image that is obtained by the processing of the imaging system 2 and the camera DSP 4 is displayed on the main display panel 6M. The CPU 31 performs a display control in parallel with the process shown in FIG. 9 so that the image data supplied from the camera DSP 4 are displayed on the main display panel 6M as the through image.

At this time, in order to perform the display control on the front display panel 6F, the CPU 31 performs the process shown in FIG. 9.

In step F201, the CPU 31 checks the image analysis results of the image analyzer 44. In this example, similar to the case of FIG. 6B, the image analyzer 44 performs an image analysis on the image data which are recorded by the imaging system 2 in the monitoring period and received by the camera DSP 4, thus determining whether or not the face of a person as a subject is included in the image data. In step F201, the CPU 31 checks whether or not the presence of the face of a person is recognized as the image analysis results of the image analyzer 44.

When the presence of the face of a person is recognized as the image analysis results, the flow proceeds from step F202 to step F203, and the CPU 31 branches its processing based on whether or not the present user setting states are appropriate for displaying the monitoring image on the front display panel 6F.

When it is determined that the user settings are appropriate for displaying the monitoring image on the front display panel 6F, the flow proceeds to step F204, and the CPU 31 causes the front display panel 6F to display the monitoring image. That is to say, the CPU 31 instructs the display controller 7 to display the same monitoring image being displayed on the main display panel 6M on the front display panel 6F. In this case, the display states of the main display panel 6M and the front display panel 6F correspond to the states as shown in FIG. 4B.

On the other hand, when it is determined from the results of the image analysis in step F201 that the face of a person is not included in the subject image, the flow proceeds from step F202 to step F205, and the CPU 31 turns off the display of the front display panel 6F.

Moreover, when it is determined in step F203 that the user settings are not appropriate for displaying the monitoring image on the front display panel 6F, the flow proceeds to F205, and the CPU 31 turns off the display of the front display panel 6F.

In such cases, the display states of the main display panel 6M and the front display panel 6F correspond to the states as shown in FIG. 4A.

The CPU 31 executes the process shown in FIG. 9 repeatedly in the monitoring period.

Therefore, in the monitoring period, the user moves the imaging apparatus 1 so that the face of a person is included in the subject image, and when the user setting states are in a predetermined state at that time, the monitoring image is displayed on the front display panel 6F as shown in FIG. 4B.

On the other hand, even when the user is targeting a subject scene without any person such as a landscape, or the face of a person is a subject, if the user setting states are not in the predetermined state, the front display panel 6F is turned off as shown in FIG. 4A.

That is, according to this processing example, when the face of a person as a subject being monitored is present in the front side, and when depending on the user setting states, the subject person is supposed to be able appropriately to view the front display panel 6F, the monitoring image is displayed on the front display panel 6F. On the other hand, when the face of a person is not included as a subject, or the subject person is supposed to be unable to appropriately view the front display panel 6F, the front display panel 6F is turned off.

The user settings include the shooting mode settings, the flash settings, and the zoom position settings, as described above. Application of the processing shown in FIG. 9 will be described for each user setting.

The shooting mode is a mode that a user selects so that shooting appropriately can be performed in various situations and includes a night scene mode, a night scene portrait mode, a portrait mode, a landscape mode, a soft snap mode, a snow mode, a beach mode, a fast shutter mode, a high sensitivity mode, and a smile shutter mode.

For each shooting mode, appropriate settings are preset such as a shutter speed, an exposure value, a signal gain of image signal, and setting for signal processing such as edge enhancement or color processing, and the user can select the shooting mode, for example, by operating the mode dial 5b shown in FIG. 1.

The night scene mode is a shooting mode that allows users to shoot with settings appropriate for shooting night scenes.

The night scene portrait mode is a shooting mode that allows users to shoot with settings enabling to shoot sharp images of the people with the night view in the background, including the look of the people.

The portrait mode is a shooting mode that allows users to shoot with settings appropriate for shooting images of people.

The landscape mode is a shooting mode that allows users to shoot with settings appropriate for shooting landscape.

The soft snap mode is a shooting mode that allows users to shoot with settings enabling images of the skin texture of people to be shot with softer and brighter impression.

The fast shutter mode is a shooting mode that allows users to shoot with setting appropriate for shooting moving subjects.

The high sensitivity mode is a shooting mode that allows users to shoot dark scenes with a natural atmosphere without using a flash.

The smile shutter mode is a shooting mode wherein the shutter is released automatically when a smile is detected on the face of a subject person.

It will be assumed that among these shooting modes, shooting modes that the CPU 31 determines in step F203 to be appropriate for the display on the front display panel 6F are the night scene portrait mode, the portrait mode, the soft snap mode, and the smile shutter mode, for example.

These shooting modes are selected when shooting images of people, and thus it is highly likely that a person is included as a subject. That is to say, it is highly likely that the person who can view the display of the front display panel 6F is present as a subject.

Therefore, when it is determined in step F203 that the shooting mode is any one of the night scene portrait mode, the portrait mode, the soft snap mode, and the smile shutter mode, the CPU 31 causes the front display panel 6F to display the monitoring image in step F204.

In a case where the other shooting modes, namely the night scene mode, the landscape mode, and the fast shutter mode, and the high sensitivity mode, are selected, it can be supposed that the user wants to shoot images of subjects other than people, or the visibility of the front display panel 6F is poor.

For example, the night scene mode and the landscape mode are selected to shoot landscape, and thus it can be supposed that no person is present in a subject image, or if present, the person is not the main subject in the image. Moreover, in the night scene mode and the high sensitivity mode, even when there was a person on the front side and a monitoring image was displayed on the front display panel 6F, the monitoring image obtained at the time of shooting a dark scene provides poor visibility to the person on the front side.

Furthermore, the subject in the fast shooting mode will be a moving subject. For example, even when a person was a subject, the person will be in such a situation such as playing sports game or dancing and thus will be unable to calmly view the front display panel 6F.

That is, in such shooting modes, it can be supposed that there is no person present on the front side, or if present, the person is unable to view the front display panel 6F with good visibility or is not viewing the front display panel 6F.

Therefore, when the shooting mode is any one of the night scene mode, the landscape mode, the fast shutter mode, and the high sensitivity mode, the flow proceeds to step F205 even when the face of a person was detected in step F202, and the CPU 31 turns off the front display panel 6F.

The above-mentioned shooting modes are examples, and in addition to these shooting modes, other shooting modes may be provided. For example, a twilight mode appropriate for shooting twilight scenes, a macro mode appropriate for the close-up shooting of plants or insects, a fireworks mode appropriate for shooting fireworks, and an underwater mode appropriate for the underwater shooting may be provided. Moreover, a snow mode that allows users to shoot with settings enabling to express the true colors of ski slope or snowy scenes, and a beach mode that allows users to shoot with settings enabling the blue of the sea or the sky to be imaged clearly may be provided.

In such cases, how the respective shooting modes will be processed in step F203 (the determination as to whether or not each of the shooting modes belongs to a predetermined shooting mode wherein the display of the front display panel 6F is performed) may be preset depending on the presence of a person, the visibility of the displayed contents on the front display panel 6F, and the situation of the person on the subject side.

Among the user settings, the shooting mode settings may be processed in the above manner.

Among the user settings, the flash settings may be processed in the following manner. The flash settings are settings that a user selects as to whether the flash will be illuminated (flash: on) or not (flash: off), or whether or not the flash will be turned on/off automatically (flash: auto).

When the user has selected the flash on setting, the surroundings are generally dark.

In dark conditions, the brightness of the monitoring image in the monitoring period is low, and thus it is supposed that the visibility of the display of the front display panel 6F is poor.

Therefore, when the flash setting is set to "flash on" the flow proceeds to step F205, and the CPU 31 turns off the front display panel 6F.

Among the user settings, the zoom position settings may be processed in the following manner. The zoom position settings are settings on the zoom position that the user selects by operating the W/T button 5c shown in FIG. 1.

For example, even when a person is a subject, when the zoom position is too close to the T side (telephoto) more than a predetermined scale, it can be supposed that the subject person is far distant from the imaging apparatus 1. In such a case, that person, at such a far distance, will be unable appropriately to view the display on the front display panel 6F.

Therefore, when it is determined in step F203 that the user-selected zoom position is at a predetermined telephoto position or more, the flow proceeds to step F205, and the CPU 31 turns off the display of the front display panel 6F.

In step F203 of FIG. 9, the CPU 31 makes the described determination based on the user settings, whereby it is possible to perform the display control appropriate for the front display panel 6F.

That is, according to the processing shown in FIG. 9, when the face is detected and the user settings are in a predetermined state, the monitoring image is displayed on the front display panel 6F in step F204. In other words, when a person is a subject and it is supposed that the person is able appropriately to view the monitoring image, the monitoring image is displayed on the front display panel 6F.

Therefore, the subject person can confirm his/her look or posture from the front display panel 6F displaying the monitoring image in which the person is being shot.

On the other hand, when a person is not present as a subject, or if present, it is supposed that it is not necessary to display the monitoring image on the front display panel 6F, the display of the front display panel 6F is turned off (for example, only the front display panel 6F is turned off). By doing so, it is possible to achieve a reduction in power consumption more appropriately.

The above determination in step F203 may be performed based on all or part of the above-mentioned user settings: the shooting mode settings, the flash settings, and the zoom position settings.

As the user settings, in addition to the above-mentioned settings, other settings may be considered such as sensitivity settings, exposure settings, hand-shake blurring correction on/off settings, or special shooting settings. For each of the settings, a determination may be made as to whether the subject person is supposed to be able appropriately to view the display of the front display panel 6F, and the determination results may be reflected on the determination in step F203.

Figure 10:
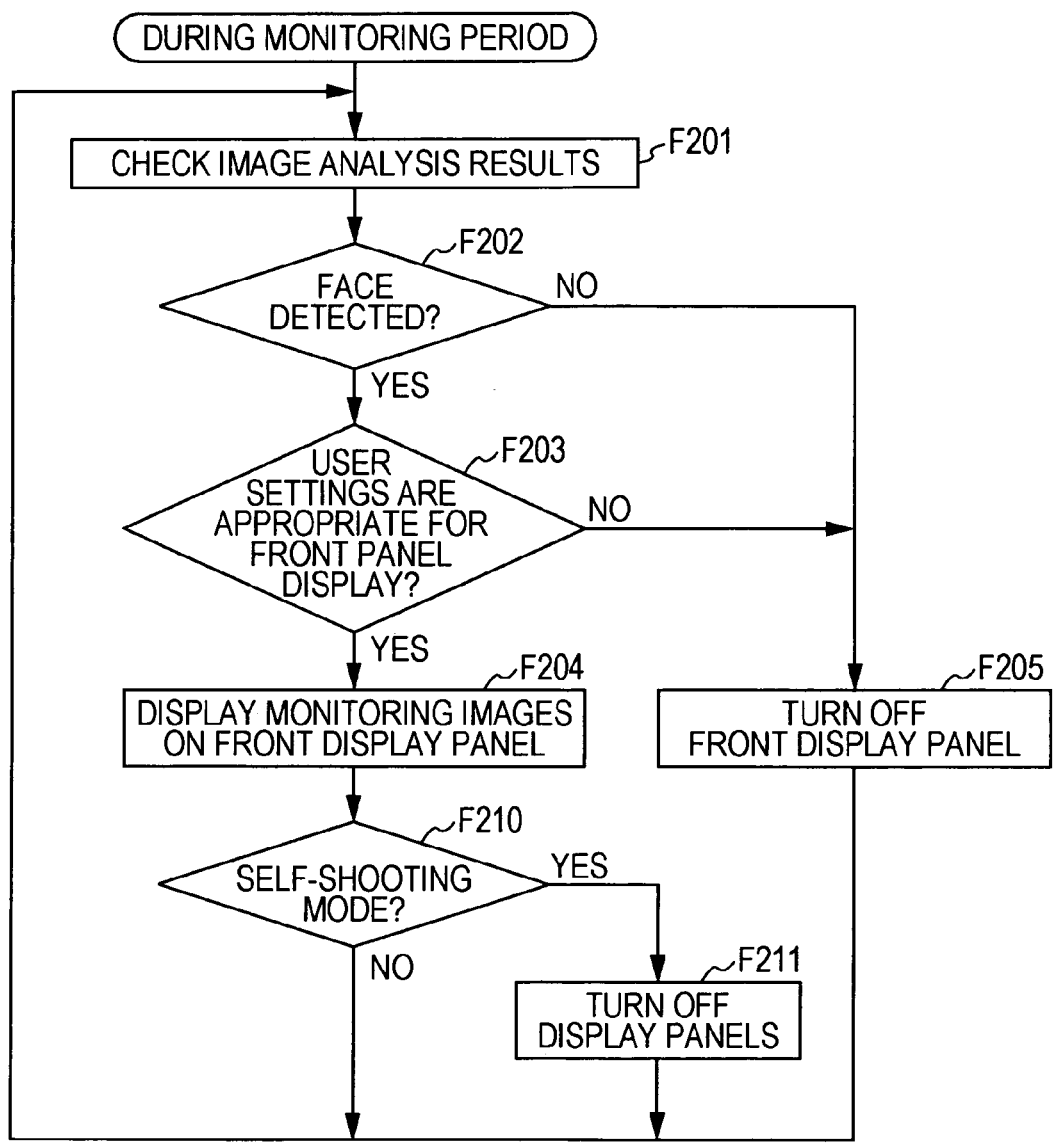
FIG. 10 is a flowchart showing a display control example of the front display panel according to the embodiment, in which a self-shooting mode is considered.

FIG. 10 shows another processing example. FIG. 10 shows a process corresponding to a case where a user is allowed to select a self-shooting mode as one of the described shooting modes. The self-shooting mode is a shooting mode where the user shoots his/her image in front of the imaging apparatus 1.

The operations in steps F201 to F205 of FIG. 10 are the same as those of steps F201 to F205 shown in FIG. 9. When the shooting mode is set to the self-shooting mode, the flow proceeds from step F203 to step F204 regardless of other user settings, and the CPU 31 performs the operation of step F204.

When the shooting mode is set to other modes different from the self-shooting mode, the same processing as that of FIG. 9 is performed.

When the shooting mode is set to the self-shooting mode, the CPU 31 performs a display control of displaying the monitoring image on the front display panel 6F in step F204, and then the flow proceeds from step F210 to step F211, and the CPU 31 turns off the display of the main display panel 6M.

That is to say, when the self-shooting mode is selected as the user settings, the display states of the front display panel 6F and the main display panel 6M correspond to the states as shown in FIG. 5A.

In the case of the self-shooting mode, the user performs shooting in front of the imaging apparatus 1 and is thus unable to view the main display panel 6M. Therefore, the monitoring image is displayed on the front display panel 6F so that the user can monitor the subject from the front display panel 6F. Moreover, the main display panel 6M is turned off, thus achieving a reduction in power consumption.

The processing examples shown in FIGS. 9 and 10 may be modified such that rather than turning off the display of the front display panel 6F in step F205, the images may be displayed in a low-brightness state as described with reference to FIG. 7, or the playback image or the preset image may be displayed as described with reference to FIG. 8.

4-3. Exemplary Processing Based on Person Recognition and Internal Detection Information Next, an example will be described in which in addition to the person recognition, the display control of the front display panel 6F is performed based on camera detection information (internal detection information) that is internally detected by the imaging apparatus 1.

The camera detection information as used herein refers to information detected by an internal sensor of the imaging apparatus 1 or information that the CPU 31 can recognize accompanying the operation control of the imaging apparatus 1. For example, the camera detection information may be ambient light intensity information, which is used for controlling the flash or exposure, zoom position information, focus information, or hand-shake blurring detection information.

Figure 11:
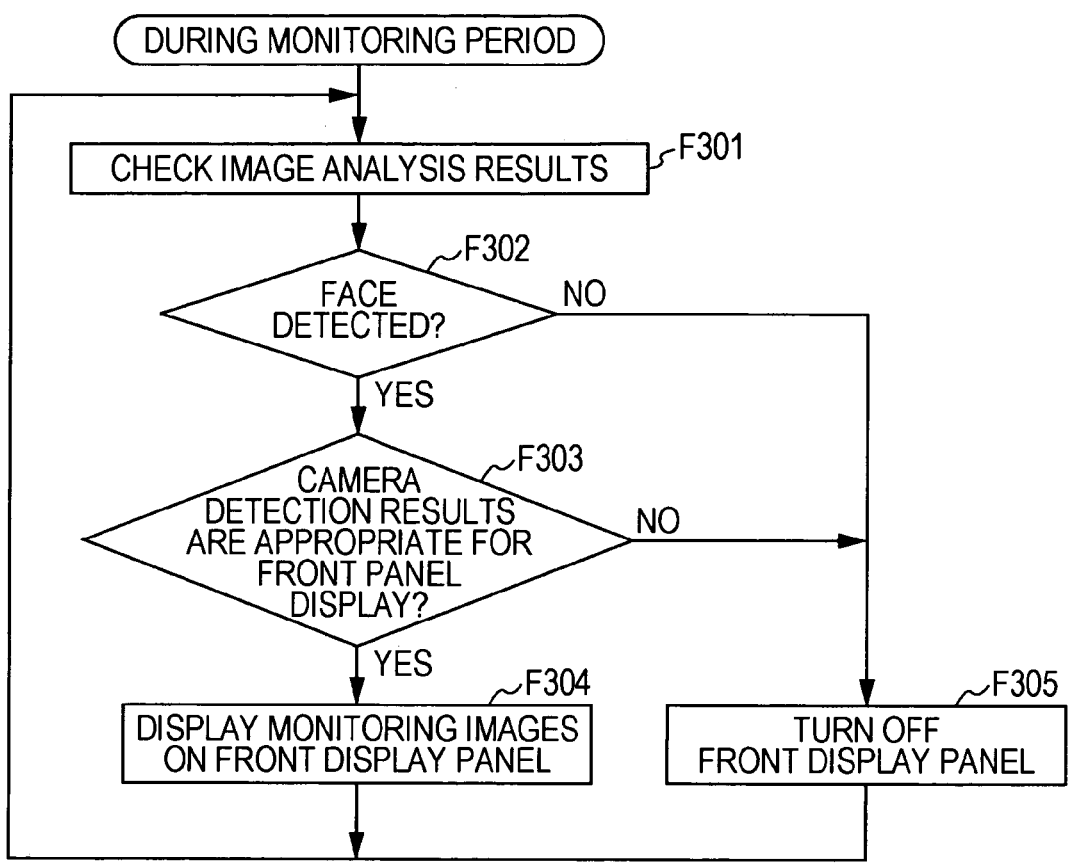
FIG. 11 is a flowchart showing a display control example of the front display panel based on person recognition and camera detection information according to the embodiment.

FIG. 11 shows an exemplary display control that the CPU 31 executes on the front display panel 6F in the monitoring period.

In the monitoring period, the CPU 31 performs the process shown in FIG. 11 in order to perform a display control on the front display panel 6F in parallel with the display control of displaying the image data supplied from the camera DSP 4 on the main display panel 6M as the through image.

The CPU 31 checks the image analysis results of the image analyzer 44 in step F301. In this example, the image analyzer 44 performs an image analysis on the image data which are recorded by the imaging system 2 in the monitoring period and received by the camera DSP 4, thus determining whether or not the face of a person as a subject is included in the image data.

In step F301, the CPU 31 checks whether or not the presence of the face of a person is recognized as the image analysis results of the image analyzer 44.

When the presence of the face of a person is recognized as the image analysis results, the flow proceeds from step F302 to step F303, and the CPU 31 checks predetermined camera detection information and branches its processing based on whether or not the camera detection information is appropriate for displaying the monitoring image on the front display panel 6F.

When it is determined from the camera detection information that the present state is appropriate for displaying the monitoring image on the front display panel 6F, the flow proceeds to step F304, and the CPU 31 causes the front display panel 6F to display the monitoring image. That is to say, the CPU 31 instructs the display controller 7 to display the same monitoring image being displayed on the main display panel 6M on the front display panel 6F. In this case, the display states of the main display panel 6M and the front display panel 6F correspond to the states as shown in FIG. 4B.

On the other hand, when it is determined from the results of the image analysis in step F301 that the face of a person is not included in the subject image, the flow proceeds to step F305, and the CPU 31 turns off the display of the front display panel 6F.

Moreover, when it is determined in step F303 from the camera detection information that the present state is not appropriate for displaying the monitoring image on the front display panel 6F, the flow proceeds to F305, and the CPU 31 turns off the display of the front display panel 6F.

In such cases, the display states of the main display panel 6M and the front display panel 6F correspond to the states as shown in FIG. 4A.

The CPU 31 executes the process shown in FIG. 9 repeatedly in the monitoring period.

Therefore, in the monitoring period, the user moves the imaging apparatus 1 so that the face of a person is included in the subject image, and when the state recognized by the camera detection information is in a predetermined state at that time, the monitoring image is displayed on the front display panel 6F as shown in FIG. 4B.

On the other hand, even when the user is targeting a subject scene without any person such as a landscape, or the face of a person is a subject, if the state recognized by the camera detection information is not in the predetermined state, the front display panel 6F is turned off as shown in FIG. 4A.

That is, according to this processing example, when the face of a person as a subject being monitored is present in the front side, and when depending on the camera detection information, the subject person is supposed to be able appropriately to view the front display panel 6F, the monitoring image is displayed on the front display panel 6F. On the other hand, when the face of a person is not included as a subject, or the subject person is supposed to be unable appropriately to view the front display panel 6F, the front display panel 6F is turned off.

For example, the camera detection information is the ambient light intensity detection information, the zoom position information, the subject distance information, the focus information, and the hand-shake blurring detection information, as described above. The determination in step F303 based on the camera detection information is made in the following manner.

The ambient light intensity can be detected from the average brightness value of the image data or the average weighted brightness value obtained by applying weighting on a partial area of a screen image. These values generally are used for automatic exposure control or flash illumination control in the case of auto flash setting. For example, these brightness values are calculated by the image signal processor of the camera DSP 4 and such information is available to the CPU 31.

Although not shown in FIG. 2, an ambient light intensity sensor or the like may be provided so as directly to detect the ambient light intensity.

If the ambient light intensity detected by these methods is low, it can be supposed that the brightness of the image is low and it is thus unable to obtain good visibility even when the monitoring image is displayed on the front display panel 6F. Moreover, if the ambient light intensity level is too high such as in a so-called counterlight state, it can be supposed that the user is unable appropriately to view the monitoring image on the front display panel 6F.

Therefore, even when the face is detected, if it is determined that the ambient light intensity is lower than a predetermined level or corresponds to the counterlight state, the CPU 31 determines that it is not appropriate to display the monitoring image on the front display panel 6F. Then, the flow proceeds from step F303 to step F305, and the CPU 31 turns off the display of the front display panel 6F.

As for the zoom position information, the CPU 31 can detect the zoom position by controlling the zoom lens in accordance with the user operations. Moreover, even when a person is a subject, when the zoom position is too close to the T side (telephoto) more than a predetermined scale, it can be supposed that the subject person is far distant from the imaging apparatus 1. That is to say, in such a case, it can be supposed that the subject person is unable appropriately to view the display on the front display panel 6F.

Therefore, when it is determined in step F303 that the zoom position is at a predetermined telephoto position or more, the flow proceeds to step F305, and the CPU 31 turns off the display of the front display panel 6F.

The subject distance information is information on the distance from the imaging apparatus 1 to the subject, and for example, the CPU 31 can obtain the subject distance information by using the information from the lens position detector 27 as described above.

For example, even when a person is a subject, if it is determined from the subject distance information that the subject person is far distant from the imaging apparatus 1, it can be supposed that the subject person is unable appropriately to view the display on the front display panel 6F.

Therefore, when it is determined from the subject distance information in step F303 that the subject is at a predetermined distance or more, the flow proceeds to step F305, and the CPU 31 turns off the display of the front display panel 6F.

The focus information is focus determination information used for autofocus processing in the image signal processor 41.

When it is not in the focused state, the CPU 31 determines that it is unable to display the monitoring image. Then, the flow proceeds from step F303 to step F305, and the CPU 31 may turn off the display of the front display panel 6F. That is to say, the monitoring image is displayed on the front display panel 6F only when it is in the focused state.

The blur detection information is detection information of hand-shake blurring or movement of the imaging apparatus 1. The CPU 31 can obtain the blur detection information as the information from the blur detector 13, for example.

When the hand-shake blurring is too large, or the user is tracking for a moving subject so the imaging apparatus 1 is moving, the user may be unable appropriately to view the monitoring image on the front display panel 6F. Therefore, when it is determined from the blur detection information in step F303 that the blurring or the movement of the imaging apparatus 1 is too large, the flow may proceed to step F305, and the CPU 31 may turn off the display of the front display panel 6F.

In step F303 of FIG. 11, the CPU 31 makes the described determination based on the camera detection information, whereby it is possible to perform the display control appropriate for the front display panel 6F.

That is, according to the processing shown in FIG. 11, when the face is detected and the camera detection information is in a predetermined state, namely when a person is a subject, and it is supposed that that person is able appropriately to view the monitoring image, the monitoring image is displayed on the front display panel 6F.

Therefore, the subject person can confirm his/her look or posture from the front display panel 6F displaying the monitoring image in which the person is being shot.

On the other hand, when a person is not present as a subject, or if present, it is supposed that it is not necessary to display the monitoring image on the front display panel 6F, the display of the front display panel 6F is turned off. By doing so, it is possible to achieve a reduction in power consumption more appropriately.

The processing example shown in FIG. 11 may be modified such that rather than turning off the display of the front display panel 6F in step F305, the images may be displayed in a low-brightness state as described with reference to FIG. 7, or the playback image or the preset image may be displayed as described with reference to FIG. 8.

4-4. Exemplary Processing Based on Person Recognition and Other Image Analysis Information Next, an example will be described in which in addition to the simple person recognition, the display control of the front display panel 6F is performed based on various analysis result information that is obtained as the results of the image analysis performed by the image analyzer 44.

Depending on the image analysis processing of the image analyzer 44, various image recognition results may be obtained in addition to the person recognition and the face recognition. For example, determination information on the ambient light intensity may be obtained. Moreover, the amount of movement of the imaging apparatus 1 relative to a subject can be detected by performing inter-frame motion detection or analyzing the amount of blur per pixel.

As an image recognition process performed when a face image is detected, the size of the face in the screen image (the percentage of the facial portion occupying in one-frame image), the orientation of the face, or the eye sight direction may be obtained as the analysis results.

In this example, a case where the various image analysis results obtained by such methods are used for display control will be described.

Figure 12:
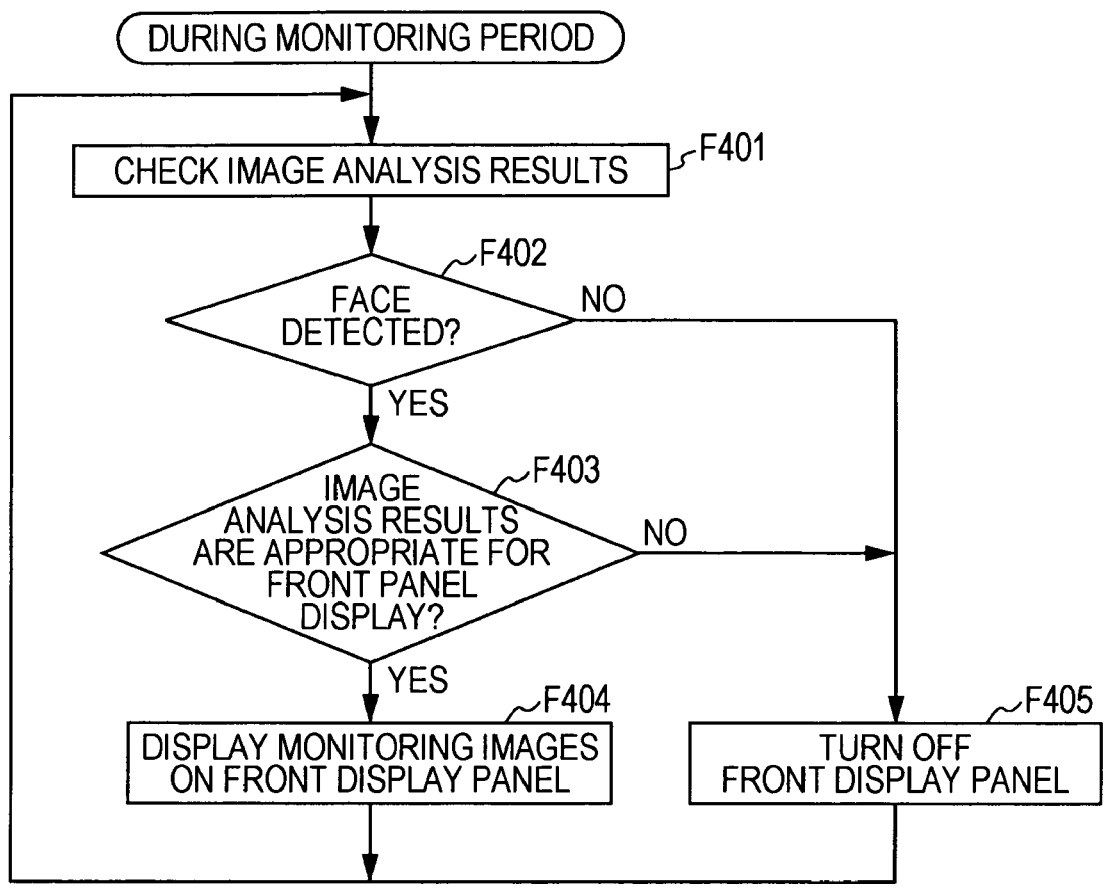
FIG. 12 is a flowchart showing a display control example of the front display panel based on person recognition and image analysis results according to the embodiment.

FIG. 12 shows an exemplary display control that the CPU 31 executes on the front display panel 6F in the monitoring period.

In the monitoring period, the CPU 31 performs the process shown in FIG. 12 in order to perform a display control on the front display panel 6F in parallel with the display control of displaying the monitoring image on the main display panel 6M.

The CPU 31 checks the image analysis results of the image analyzer 44 in step F401. In this example, the image analyzer 44 performs an image analysis on the image data which are recorded by the imaging system 2 in the monitoring period and received by the camera DSP 4, thus determining whether or not the face of a person as a subject is included in the image data.

In this example, the image analyzer 44 not only performs processing for the face detection but also performs various image recognition processing as described above.

The CPU 31 checks the various image analysis results of the image analyzer 44 in step F401.

Then, the CPU 31 determines in step F402 whether or not the presence of the face of a person is detected as one of the image analysis results, and if the presence is detected, the flow proceeds to step F403.

In step F403, the CPU 31 checks another image analysis results and branches its processing based on whether or not the image analysis results are appropriate for displaying the monitoring image on the front display panel 6F.

That is, when it is determined from the various image analysis results that the present state is appropriate for displaying the monitoring image on the front display panel 6F, the flow proceeds to step F404, and the CPU 31 causes the front display panel 6F to display the monitoring image. That is to say, the CPU 31 instructs the display controller 7 to display the same monitoring image being displayed on the main display panel 6M on the front display panel 6F. In this case, the display states of the main display panel 6M and the front display panel 6F correspond to the states as shown in FIG. 4B.

On the other hand, when it is determined from the results of the image analysis in step F401 that the face of a person is not included in the subject image, the flow proceeds to step F405, and the CPU 31 turns off the display of the front display panel 6F.

Even when the face of a person is detected, even if it is determined from another analysis results in step F403 that the present state is not appropriate for displaying the monitoring image on the front display panel 6F, the flow proceeds to step F405, and the CPU 31 turns off the display of the front display panel 6F.

In this case, the display states of the main display panel 6M and the front display panel 6F correspond to the states as shown in FIG. 4A.

The CPU 31 executes the process shown in FIG. 9 repeatedly in the monitoring period.

Therefore, in the monitoring period, the user moves the imaging apparatus 1 so that the face of a person is included in the subject image, and when the state recognized by the various image analysis results is in a predetermined state, the monitoring image is displayed on the front display panel 6F as shown in FIG. 4B.

On the other hand, even when the user is targeting a subject scene without any person such as a landscape, or the face of a person is a subject, if the state recognized by the various image analysis results is not in the predetermined state, the front display panel 6F is turned off as shown in FIG. 4A.

The processing example of step F403 corresponding to image analysis results other than the presence of the face will be described below.

The ambient light intensity may be detected as the image analysis results. Although described above in connection with the camera detection information, when the ambient light intensity is low or extremely high such as in a so-called counterlight state, it can be supposed that the user is unable appropriately to view the monitoring image on the front display panel 6F.

Therefore, even when the face is detected, if it is determined that the ambient light intensity is lower than a predetermined level or corresponds to the counterlight state, the CPU 31 determines that it is not appropriate to display the monitoring image on the front display panel 6F. The flow proceeds to step F405, and the CPU 31 turns off the display of the front display panel 6F.

Moreover, the amount of movement of the imaging apparatus 1 relative to a subject may be detected as the image analysis results. That is to say, a case where the imaging apparatus 1 itself is shaking or moving (the user is moving the imaging apparatus 1), a case where the subject is moving, or a case where both the imaging apparatus 1 and the subject are moving can be considered.

In such cases, even if the amount of movement is too large, it can be supposed that, when there is a person present as a subject, the person will be unable to view the front display panel 6F.

Therefore, when it is determined in step F403 that the amount of movement of the imaging apparatus 1 relative to the subject is large, the flow proceeds to step F405, and the CPU 31 may turn off the display of the front display panel 6F.

From the image analysis results, it is not only possible to detect the face but also to detect the size of the face (the percentage of the facial portion in the screen image).

Although the size of the face changes depending on the zoom position, the size of the face at a predetermined zoom position serves as one of the indications used for determining the distance from the imaging apparatus 1 to the subject person.

For example, if the zoom position is at the wide position, even when the face is recorded small, it can be supposed that that person is at a far distance.

Therefore, in step F403, the CPU 31 determines the distance of the subject person based on the face size considering the zoom position. When it is determined that the person is at such a distance as to be unable to view the displayed contents on the front display panel 6F, the CPU 31 may turn off the display of the front display panel 6F in step F405.

Moreover, the orientation of the face or the eye sight direction may be recognized as the image analysis results.

When the face is not oriented toward the front side on the image or the eye sight direction is not in the forward direction, the subject person will be unable to view the imaging apparatus 1. That is, it can be determined that the person is not viewing the front display panel 6F.

Therefore, the CPU 31 checks the orientation of the face or the eye sight direction in step F403. When it is determined that the person is not viewing the displayed contents on the front display panel 6F, the CPU 31 may turn off the display of the front display panel 6F in step F405.

In step F403 of FIG. 12, the CPU 31 makes the described determination based on the image analysis results, whereby it is possible to perform the display control appropriate for the front display panel 6F.

That is, according to the processing shown in FIG. 12, when the face is detected, and it is determined from other image analysis results that the present state is in a predetermined state, namely when a person is a subject and it is supposed that that person is able appropriately to view (or viewing) the monitoring image, the monitoring image is displayed on the front display panel 6F.

Therefore, the subject person can confirm his/her look or posture from the front display panel 6F displaying the monitoring image in which the person is being shot.

On the other hand, when a person is not present as a subject, or if present, it is supposed that it is not necessary to display the monitoring image on the front display panel 6F, the display of the front display panel 6F is turned off. By doing so, it is possible to achieve a reduction in power consumption more appropriately.

The processing example shown in FIG. 12 may be modified such that rather than turning off the display of the front display panel 6F in step F405, the images may be displayed in a low-brightness state as described with reference to FIG. 7, or the playback image or the preset image may be displayed as described with reference to FIG. 8.

Figure 13:
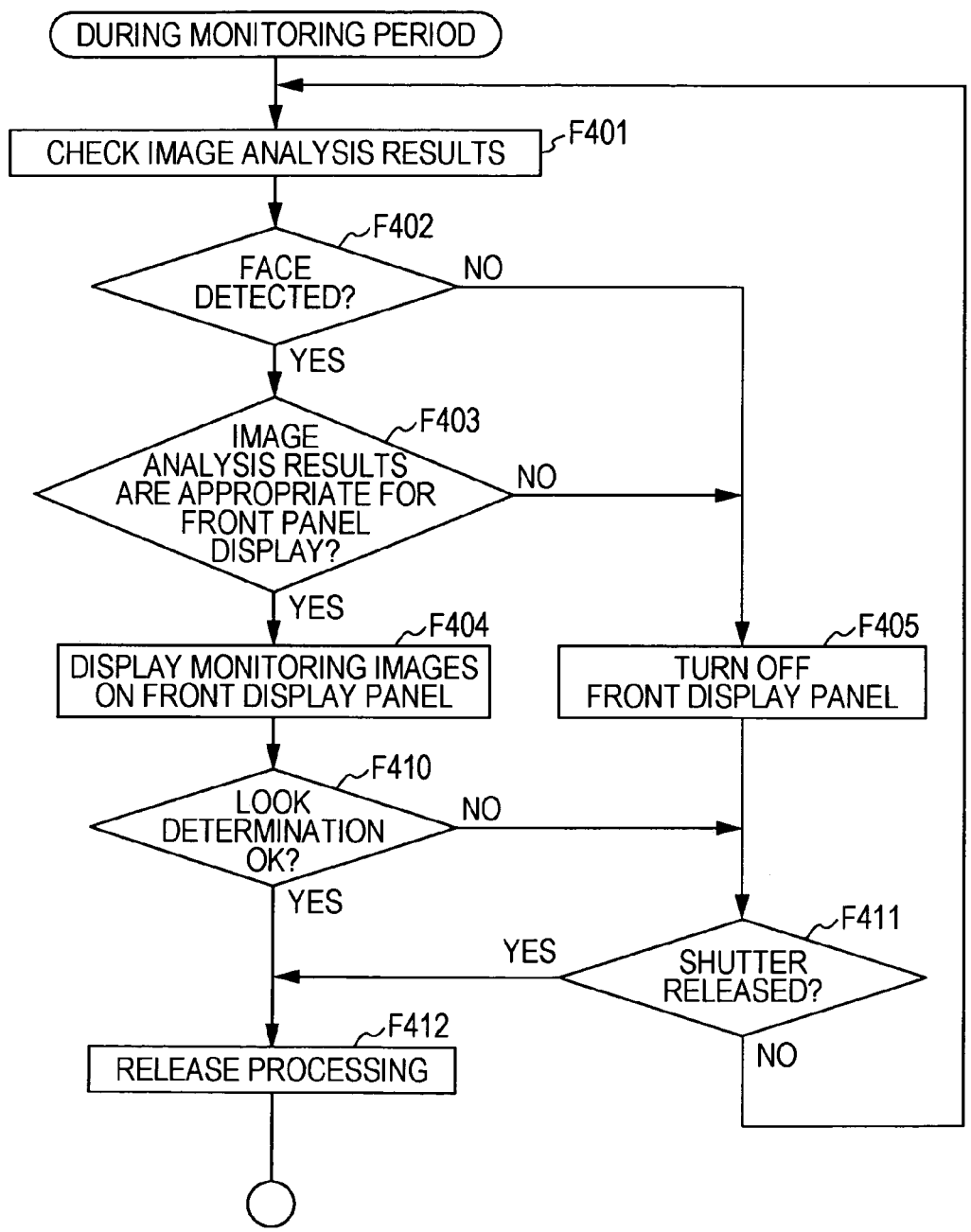
FIG. 13 is a flowchart showing a display control example of the front display panel according to the embodiment, in which a smile shutter mode is considered.

FIG. 13 shows a modification of the processing example shown in FIG. 12, which can be applied when the shooting mode is set to the smile shutter mode.

The operations in steps F401 to F405 of FIG. 13 are the same as those shown in FIG. 12. Although FIG. 12 does not depict the user's release operation (which triggers the transition to the shooting period), the process of transitioning to the shooting period is included in FIG. 13.

As the results of the image analysis, the look of the subject person can be detected in addition to the face detection and the above-described various detections.

Therefore, when the monitoring image is displayed on the front display panel 6F in response to the presence of a subject person or other analysis results, the CPU 31 checks the determination results on the subject person's look in step F410.

When a smiling face is detected as the image analysis results by the look determination, the flow proceeds to step F412 automatically, and the CPU 31 performs release processing, namely records the image data at that time.

When the user manually performs the release operation, the flow proceeds from step F411 to step F412, and the release processing is performed.

By displaying the monitoring image on the front display panel 6F and performing the processing in the smile shutter mode, the subject person is able to record his/her image with a smiling face while monitoring his/her look on the front display panel 6F.

5. Display Control of Front Display Panel During Playback

While the control processing examples of the front display panel 6F in the monitoring period have been described hereinabove, an exemplary display control of the front display panel 6F in the playback period will be described below.

As described in connection with FIG. 3, when the user performs an operation that instructs a playback operation, the operation state transitions to a playback operation state (playback period). In the playback period, an operation of playing back images recorded on the recording medium 90 or the flash ROM 33 is performed.

The CPU 31 reads images recorded on the recording medium 90 or the flash ROM 33 in accordance with the user operations and controls the display controller 7 to display thumbnail images or a single playback image on the main display panel 6M.

Figure 14:
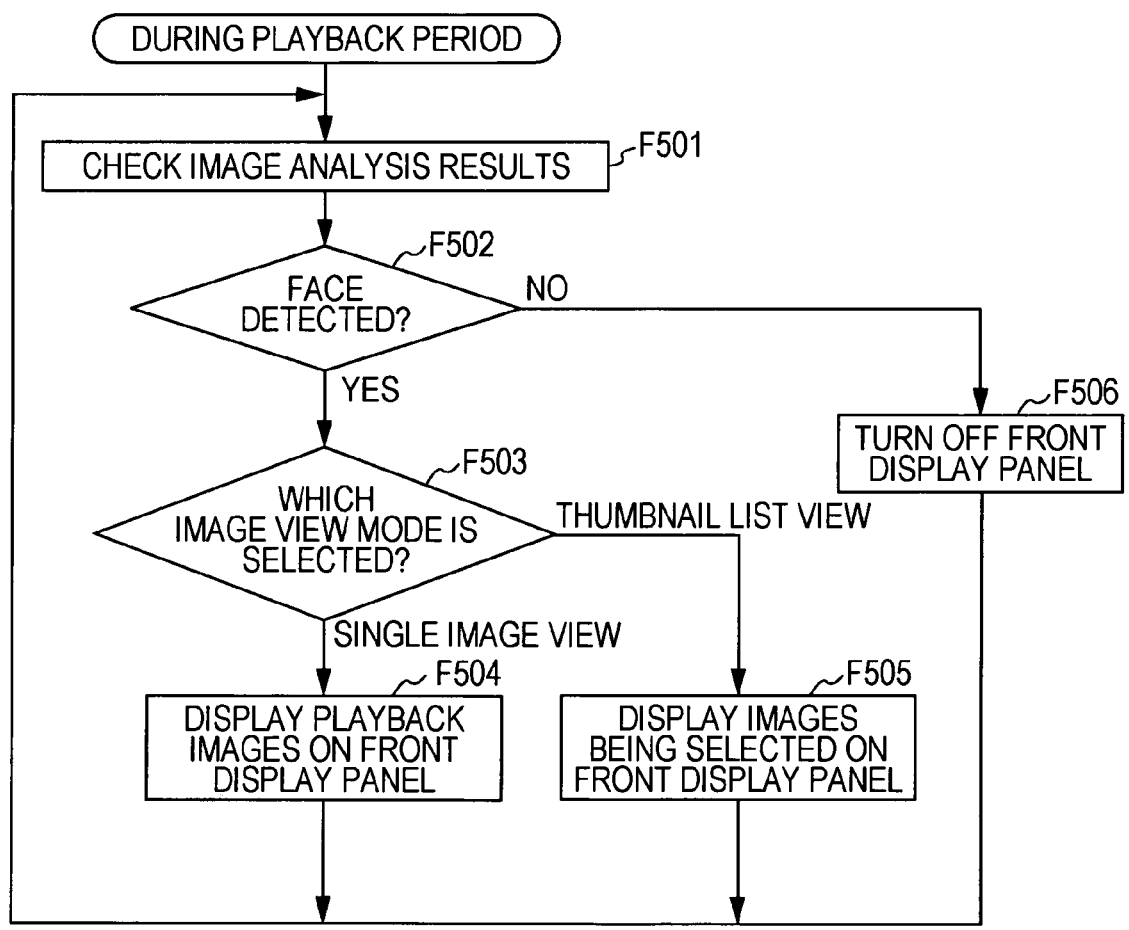
FIG. 14 is a flowchart showing a display control example of the front display panel during playback according to the embodiment.

At that time, the CPU 31 performs the process shown in FIG. 14 with respect to the front display panel 6F.

That is, in the playback period, the CPU 31 checks the image analysis results of the image analyzer 44 in step F501.

Although generally it is unnecessary for the imaging system 2 and the camera DSP 4 to perform the imaging process in the playback period, in the case of performing the process of this example, it will be assumed that the imaging system 2 and the camera DSP 4 perform the imaging processing. Moreover, the image analyzer 44 performs an image analysis on the image data which are recorded by the imaging system 2 and received by the camera DSP 4, thus determining whether or not a person is present in the subject direction.

In step F501, the CPU 31 checks the image analysis results of the image analyzer 44, and when the presence of the face of a person is detected, the flow proceeds from step F502 to step F503.

In this case, the CPU 31 branches its processing based on the present playback display state on the main display panel 6M. That is to say, the processing is branched based on whether the playback images are displayed on the main display panel 6M in a thumbnail view or a single image is displayed on the main display panel 6M.

When a single playback image presently is being displayed on the main display panel 6M, the flow proceeds to step F504, and the CPU 31 instructs the display controller 7 to display the same playback image data on the front display panel 6F. In this case, the display states of the main display panel 6M and the front display panel 6F correspond to the states as shown in FIG. 5C.

On the other hand, a list of thumbnail images presently are being displayed on the main display panel 6M, the CPU 31 causes the flow to proceed to step F505. In this case, the CPU 31 instructs the display controller 7 to display the playback image data being selected with a cursor K on the thumbnail list view on the front display panel 6F. In this case, the display states of the main display panel 6M and the front display panel 6F correspond to the states as shown in FIG. 5B.

When the presence of a person's face is not detected in step F502 during playback, the flow proceeds from step F502 to step F506, and the CPU 31 turns off the front display panel 6F.

By performing such processing, a person on the front side is able to view the same playback image on the front display panel 6F. Therefore, the user of the imaging apparatus 1 and the person on the front side can enjoy the same playback image.

Moreover, when a list of thumbnail images are displayed on the main display panel 6M as shown in FIG. 5B, the user of the imaging apparatus 1 can move the cursor K so that a person on the front side can view the selected playback image on the front display panel 6F.

Furthermore, when there is no person present on the front side, it is possible to achieve a reduction in power consumption by turning off the front display panel 6F.

The processing example shown in FIG. 14 may be modified such that rather than turning off the display of the front display panel 6F in step F506, the images may be displayed in a low-brightness state as described with reference to FIG. 7, or a special playback image or a preset image may be displayed.

6. Modification

While various processing examples according to the embodiments and modifications have been described, still further diverse modifications can be considered as the embodiments of the present invention.

Although in the processing examples shown in FIGS. 9 to 14, the determination as to whether or not a person who is able to view the front display panel 6F is present on the front side was made based on the face detection results obtained through the image analysis, the determination may be made based on person detection (detection of a person's body in an image) rather than the face detection. Moreover, the determination may be made based on the detection results of the proximity sensor 50.

Moreover, when there is no person present on the front side, or if present, it is supposed that the person is unable to view, or is not viewing, the front display panel 6F, the user may select as to whether or not the front display panel 6F will be turned off, whether or not the images will be displayed in a low brightness state, and whether or not the playback image or the preset image will be displayed.

The above embodiments have been described for the example where on the condition that the presence of a person is detected by the face recognition or the like, the display control of the front display panel 6F is performed based on the user setting states and the camera detection information (internal detection information), or in combination with other image analysis results. This information may be combined further.

For example, an example may be considered where the display control of the front display panel 6F is performed based on the person detection results, the user setting states, and the camera detection information.

Moreover, an example may be considered where the display control of the front display panel 6F is performed based on the person detection results, the user setting states, and the image analysis results obtained through processing different from the person recognition.

Furthermore, an example may be considered where the display control of the front display panel 6F is performed based on the person detection results, the camera detection information, and the image analysis results obtained through processing different from the person recognition.

Furthermore, an example may be considered where the display control of the front display panel 6F is performed based on the person detection results, the user setting states, the camera detection information, and the image analysis results obtained through processing different from the person recognition.

Although the present embodiment has been described with respect to still image shooting, the present invention can be applied to movie shooting.

In the case of movie shooting, the monitoring period corresponds to a standby period before the start of shooting. Moreover, the recording period corresponds to a movie recording period from the start to the end of recording.

Therefore, in the standby period or the recording period, the movie display control of the front display panel 6F may be performed based on the person detection results, the user setting states, and the camera detection information, or in combination with other image analysis results.

In the present embodiment, although an apparatus generally called digital camera was exemplified as the imaging apparatus 1, the present invention can be applied to various apparatuses such as video cameras, or cellular phones and PDAs (personal digital assistant) with imaging capabilities.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a first display panel that is mounted on an apparatus casing so as to display images or data in a direction towards a user;
a second display panel that is mounted on the apparatus casing so as to display said images or data in a direction towards a subject;
an imaging processor that performs a photoelectric conversion on incident light from the subject direction to obtain image signals;
a person detector that detects whether or not a person is present in the subject direction; and
a controller that allows said images or data based on the image signals obtained by the imaging processor to be displayed on the first display panel and controls an operation of displaying the images or data based on the image signals obtained by the imaging processor on the second display panel in accordance with at least the detection results of the person detector,
wherein when the presence of a person is detected by the person detector and it is determined that a state of the person is appropriate for viewing of the second display panel by the person, the controller performs a control such that the images or data based on the image signals obtained by the imaging processor are displayed on the second display panel, and
wherein when the presence of said person is not detected by the person detector, and when the presence of a person is detected by the person detector but it is determined that a state of the person is not appropriate for viewing of the second display panel by the person, the controller performs a control such that the images or data based on the image signals obtained by the imaging processor are not displayed on the second display panel.

2. The imaging apparatus according to claim 1, wherein when the presence of said person is detected by the person detector, the controller performs a control such that the images or data based on the image signals obtained by the imaging processor are displayed on the second display panel.

3. The imaging apparatus according to claim 2, wherein when the presence of said person is not detected by the person detector, the controller performs a control such that images or data are not displayed on the second display panel.

4. The imaging apparatus according to claim 2, wherein when the presence of said person is not detected by the person detector, the controller performs a control such that the images or data based on the image signals obtained by the imaging processor are displayed on the second display panel in a low-brightness state compared to a normal display operation.

5. The imaging apparatus according to claim 2, further comprising an image data reader that reads image data recorded on a recording medium,
wherein when the presence of said person is not detected by the person detector, the controller performs a control such that said images or data based on the image data read by the image data reader are displayed on the second display panel.

6. The imaging apparatus according to claim 1, wherein the controller controls the operation of displaying the images or data based on the image signals obtained by the imaging processor on the second display panel in accordance with the detection results of the person detector and the user-selected settings regarding operations of the imaging apparatus.

7. The imaging apparatus according to claim 1, wherein the controller controls the operation of displaying the images or data based on the image signals obtained by the imaging processor on the second display panel in accordance with the detection results of the person detector and internal detection information which is internally detected by the imaging apparatus.

8. The imaging apparatus according to claim 1, wherein the controller controls the operation of displaying the images or data based on the image signals obtained by the imaging processor on the second display panel in accordance with the detection results of the person detector and image analysis information which is obtained by analyzing the image signals obtained by the imaging processor.

9. The imaging apparatus according to claim 1, wherein the person detector detects whether or not said person is present in the subject direction by performing image analysis on the image signals obtained by the imaging processor.

10. The imaging apparatus according to claim 9, wherein the person detector performs person detection by determining whether or not the face of said person as the subject is included in the image signals based on the results of the image analysis on the image signals obtained by the imaging processor.

11. The imaging apparatus according to claim 1, wherein the person detector is configured by a proximity sensor that detects presence of said person in the subject direction.

12. The imaging apparatus according to claim 1, further comprising an image data reader that reads image data recorded on a recording medium,
wherein the controller allows said images or data based on the image data read by the image data reader to be displayed on the first display panel and controls an operation of displaying the images or data based on the image data read by the image data reader on the second display panel in accordance with at least the detection results of the person detector.

13. An imaging apparatus comprising:
a first display panel that is mounted on an apparatus casing so as to display images or data in a direction towards a user;
a second display panel that is mounted on the apparatus casing so as to display said images or data in a direction towards a subject;
an imaging processor that performs a photoelectric conversion on incident light from the subject direction to obtain image signals;
a person detector that detects whether or not a person is present in the subject direction;
a controller that allows said images or data based on the image signals obtained by the imaging processor to be displayed on the first display panel and controls an operation of displaying the images or data based on the image signals obtained by the imaging processor on the second display panel in accordance with at least the detection results of the person detector; and
an image data reader that reads image data recorded on a recording medium,
wherein the controller allows said images or data based on the image data read by the image data reader to be displayed on the first display panel and controls an operation of displaying the images or data based on the image data read by the image data reader on the second display panel in accordance with at least the detection results of the person detector, and
wherein when said images or data based on a plurality of image data read by the image data reader are displayed on the first display panel, the controller allows image data based on image data selected from the plurality of image data being displayed on the first display panel to be displayed on the second display panel.

14. An imaging apparatus comprising:
an imaging processor that performs photoelectric conversion on incident light coming through a lens system to obtain image signals;
a first display panel that is arranged on a surface of an apparatus casing where the incident light is incident;
a second display panel that is arranged on a surface opposing the first display panel;
a person detector that detects whether or not a person is present in a subject direction; and
a controller that allows images or data based on the image signals obtained by the imaging processor to be displayed on the first display panel and controls an operation of displaying the images or data based on the image signals obtained by the imaging processor on the second display panel in accordance with at least the detection results of the person detector,
wherein when the presence of said person is detected by the person detector and it is determined that a state of the person is appropriate for viewing of the second display panel by the person, the controller performs a control such that the images or data based on the image signals obtained by the imaging processor are displayed on the second display panel, and
wherein when the presence of said person is not detected by the person detector, and when the presence of said person is detected by the person detector but it is determined that a state of the person is not appropriate for viewing of the second display panel by the person, the controller performs a control such that the images or data based on the image signals obtained by the imaging processor are not displayed on the second display panel.

15. A display control method in an imaging apparatus, comprising the steps of:
detecting whether or not a person is present in a subject direction;
allowing images or data based on image signals which are obtained by performing a photoelectric conversion on incident light from the subject direction to be displayed on a first display panel that is mounted on an apparatus casing so as to display images or data in a user direction; and
controlling an operation of displaying the images or data based on the image signals on a second display panel that is mounted on the apparatus casing so as to display said images or data in the subject direction in accordance with at least the detection results in the person detection step,
wherein when the presence of said person is detected in the subject direction and it is determined that a state of the person is appropriate for viewing of the second display panel by the person, a control is performed such that the images or data based on the image signals are displayed on the second display panel, and wherein when the presence of said person is not detected in the subject direction, and when the presence of said person is detected in the subject direction but it is determined that a state of the person is not appropriate for viewing of the second display panel by the person, a control is performed such that the images or data based on the image signals are not displayed on the second display panel.

16. A display control method in an imaging apparatus, comprising the steps of:

detecting whether or not a person is present in a subject direction;

allowing images or data based on image signals which are obtained by performing a photoelectric conversion on incident light coming through a lens system to be displayed on a first display panel that is arranged on a surface of an apparatus casing where the incident light is incident; and controlling an operation of displaying the images or data based on the image signals on a second display panel that is arranged on a surface opposing the first display panel in accordance with at least the detection results in the person detection step, wherein when the presence of said person is detected in the subject direction and it is determined that a state of the person is appropriate for viewing of the second display panel by the person, a control is performed such that the images or data based on the image signals are displayed on the second display panel, and wherein when the presence of said person is not detected in the subject direction, and when the presence of said person is detected in the subject direction but it is determined that a state of the person is not appropriate for viewing of the second display panel by the person, a control is performed such that the images or data based on the image signals are not displayed on the second display panel.

* * * * *